United States Patent
Ito et al.

(10) Patent No.: US 12,351,407 B2
(45) Date of Patent: Jul. 8, 2025

(54) TRANSPORT SYSTEM, PROCESSING SYSTEM, AND METHOD OF MANUFACTURING ARTICLE

(71) Applicant: CANON KABUSHIKI KAISHA, Tokyo (JP)

(72) Inventors: Keisuke Ito, Kanagawa (JP); Takeshi Yamamoto, Kanagawa (JP); Gaku Kawaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 961 days.

(21) Appl. No.: 17/481,121

(22) Filed: Sep. 21, 2021

(65) Prior Publication Data
US 2022/0097984 A1    Mar. 31, 2022

(30) Foreign Application Priority Data

Sep. 25, 2020   (JP) .................................. 2020-161489

(51) Int. Cl.
*B65G 54/02*    (2006.01)
*B60L 13/03*    (2006.01)
(Continued)

(52) U.S. Cl.
CPC .............. *B65G 54/02* (2013.01); *B60L 13/03* (2013.01); *B60L 13/035* (2013.01); *B60L 13/04* (2013.01);
(Continued)

(58) Field of Classification Search
CPC ....... B65G 54/02; B60L 13/03; B60L 13/035; B60L 13/04; B60L 13/06; B60L 13/08;
(Continued)

(56) References Cited

U.S. PATENT DOCUMENTS 5,360,470 A * 11/1994 Ono ...................... F16C 32/044
                                                    104/284
6,601,519 B1 * 8/2003 Bindloss, Jr. ........... B60L 13/06
                                                    104/284
(Continued)

FOREIGN PATENT DOCUMENTS

CA    2065098 A1   10/1992
CN   108946032 A   12/2018
(Continued)

OTHER PUBLICATIONS

China National Intellectual Property Administration, Second Office Action, Application No. 202111114118.3, Apr. 2024.

*Primary Examiner* — S. Joseph Morano
*Assistant Examiner* — James William Jones
(74) *Attorney, Agent, or Firm* — Canon U.S.A., Inc. IP Division

(57) ABSTRACT

A transport system includes: a transport path housing; a first magnetic force unit provided in the transport path housing; a transport vehicle that includes a second magnetic force unit provided so as to be able to face the first magnetic force unit and is able to travel along the transport path housing while being levitated by magnetic force acting between the first magnetic force unit and the second magnetic unit; a rail on which the transport vehicle lands to be able to travel, the rail being provided in the transport path housing; and at least one moving means for moving the transport vehicle in a landing state where the transport vehicle lands on the rail, to a position where the transport vehicle is be able to be levitated by the magnetic force.

11 Claims, 33 Drawing Sheets

(51) Int. Cl.
  B60L 13/04    (2006.01)
  B60L 13/06    (2006.01)
  B60L 13/08    (2006.01)
  B60L 13/10    (2006.01)
  E01B 25/30    (2006.01)
  E01B 25/32    (2006.01)
  H02N 15/00    (2006.01)

(52) U.S. Cl.
  CPC .............. B60L 13/06 (2013.01); B60L 13/08 (2013.01); B60L 13/10 (2013.01); E01B 25/305 (2013.01); E01B 25/30 (2013.01); E01B 25/32 (2013.01); H02N 15/00 (2013.01); Y02P 90/60 (2015.11)

(58) Field of Classification Search
  CPC ........ B60L 13/10; E01B 25/305; E01B 25/32; E01B 25/30; H02N 15/00; Y02P 90/60
  USPC ......................................................... 104/282
  See application file for complete search history.

(56) References Cited

U.S. PATENT DOCUMENTS

| | | | |
|---|---|---|---|
| 10,562,720 B2 | 2/2020 | Yamamoto | |
| 11,878,828 B2 | 1/2024 | Mattioli et al. | |
| 2003/0205163 A1* | 11/2003 | Lamb | B65G 54/02 |
| | | | 104/282 |
| 2005/0223934 A1* | 10/2005 | Li | E01B 25/30 |
| | | | 104/123 |
| 2014/0318408 A1* | 10/2014 | Bogl | B61C 3/00 |
| | | | 104/291 |
| 2017/0183829 A1* | 6/2017 | Wamble, III | B60L 13/04 |
| 2018/0334338 A1* | 11/2018 | Yamamoto | B65G 54/02 |
| 2020/0052568 A1* | 2/2020 | Yamamoto | H02K 11/21 |
| 2020/0189054 A1 | 6/2020 | Mimura | |
| 2021/0380300 A1* | 12/2021 | Mattioli | B65B 35/56 |

FOREIGN PATENT DOCUMENTS

| | | | |
|---|---|---|---|
| CN | 110466849 A | | 11/2019 |
| JP | S627305 A | | 1/1987 |
| JP | S6474006 A | * | 3/1989 |
| JP | H038467 A | | 1/1991 |
| JP | H0640542 A | | 2/1994 |
| JP | H07177612 A | | 7/1995 |
| JP | H1095533 A | * | 4/1998 |
| JP | H10291625 A | | 11/1998 |
| JP | 11243607 A | * | 9/1999 |
| JP | 6617249 B1 | | 12/2019 |
| JP | 2020094263 A | | 6/2020 |
| KR | 20120128478 A | | 11/2012 |

* cited by examiner

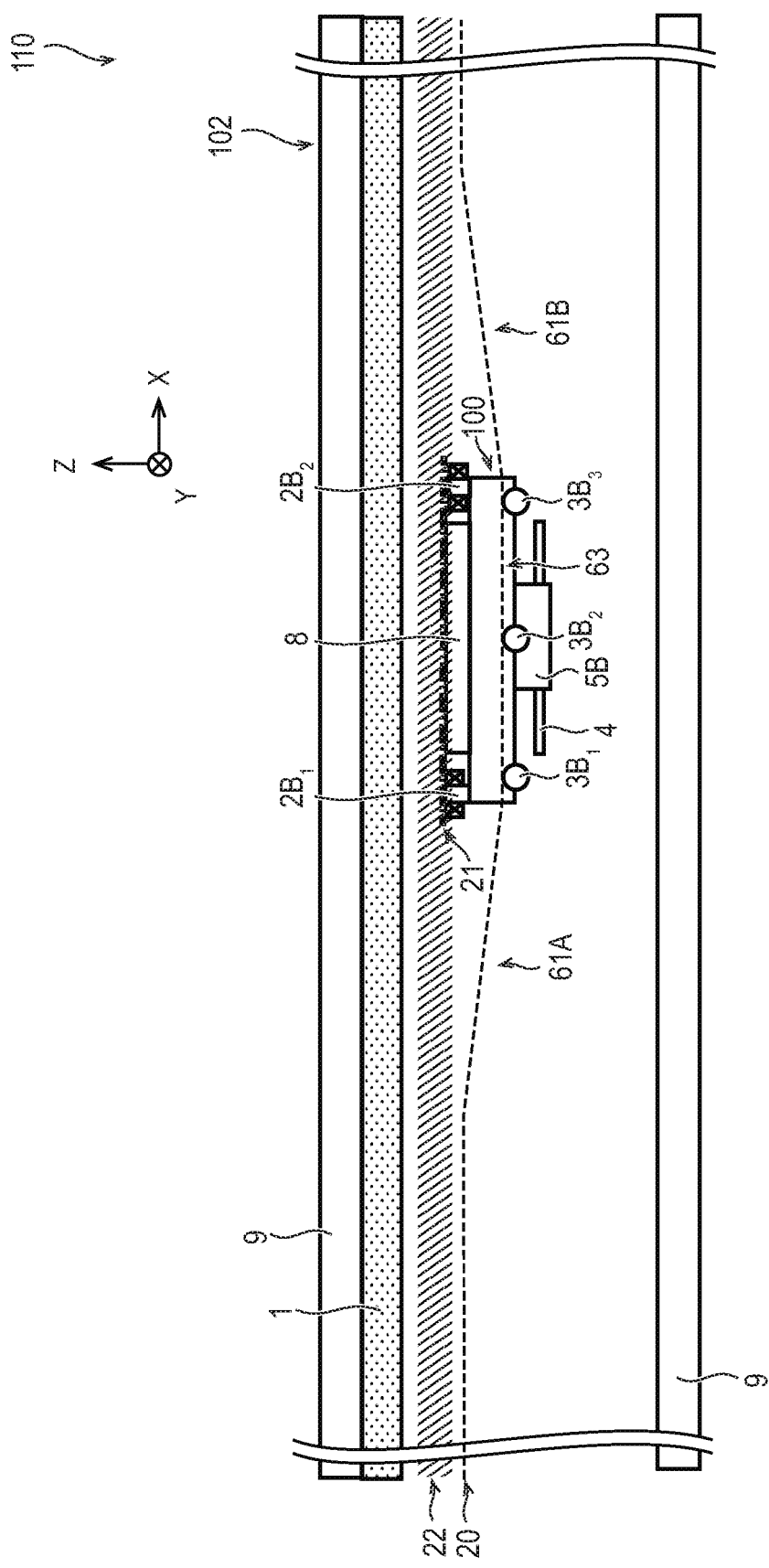

TRANSPORT SYSTEM, PROCESSING SYSTEM, AND METHOD OF MANUFACTURING ARTICLE

BACKGROUND

Field of the Disclosure

The present disclosure relates to a transport system, a processing system and a method of manufacturing an article.

Description of the Related Art

Japanese Patent Application Laid-Open No. H10-95533 discloses a magnetic levitation type transport apparatus including a transport path in which a stator is arranged and a guide rail is laid, and a transport vehicle mounted with a plurality of magnet units opposed to the guide rail and a secondary conductor opposed to the stator. In the transport apparatus disclosed in Japanese Patent Application Laid-Open No. H10-95533, the transport vehicle floats by electromagnetic force between the guide rail and the magnet unit and travels by electromagnetic force between the stator and the secondary conductor. Japanese Patent Application Laid-Open No. H10-95533 discloses that a transport vehicle attracted to the guide rail via the magnetic unit is pulled down from the guide rail by a handle or a gear mechanism provided on the transport vehicle, or a coil wound on the guide rail.

SUMMARY

According to one aspect of the present disclosure, there is provided a transport system including: a transport path housing; a first magnetic force unit provided in the transport path housing; a transport vehicle that includes a second magnetic force unit provided so as to be able to face the first magnetic force unit and is able to travel along the transport path housing while being levitated by magnetic force acting between the first magnetic force unit and the second magnetic unit; a rail on which the transport vehicle lands to be able to travel, the rail being provided in the transport path housing; and at least one moving means for moving the transport vehicle in a landing state where the transport vehicle lands on the rail, to a position where the transport vehicle is be able to be levitated by the magnetic force.

Further features of various embodiments will become apparent from the following description of exemplary embodiments with reference to the attached drawings.

BRIEF DESCRIPTION OF THE DRAWINGS

FIG. 8A, FIG. 8B, FIG. 8C, and FIG. 8D are diagrams illustrating a specific structure of a slope as moving means and takeoff operation in a transport system according to a sixth embodiment.

DESCRIPTION OF THE EMBODIMENTS

However, in the apparatus disclosed in Japanese Patent Application Laid-Open No. H10-95533, even if the vehicle attracted to the guide rail can be pulled down from the guide rail and returned to the magnetically levitated state, it is difficult to take off the vehicle that has landed away from the guide rail and put the vehicle in the magnetically levitated state. Further, in the transfer apparatus disclosed in Japanese Patent Application Laid-Open No. H10-95533, since the transfer vehicle is provided with a handle or a gear as a mechanism for separating the transfer vehicle from the guide rail, the cost of the apparatus increases as the number of transfer vehicles increases. In addition, since the weight of the transport vehicle increases, it is necessary to increase the size of the coil for applying the levitation force or the thrust to the transport vehicle, which increases the cost of the apparatus. Further, since the transfer vehicle is large, the transfer path must be large, and the cost of the apparatus is increased.

Various embodiments intend to provide a transport system that can easily realize a takeoff of a transport vehicle to be levitated while keeping the cost of the apparatus low.

First Embodiment

A transport system according to a first embodiment will be described below with reference to FIG. 1A to FIG. 2D.

Figure 1A:
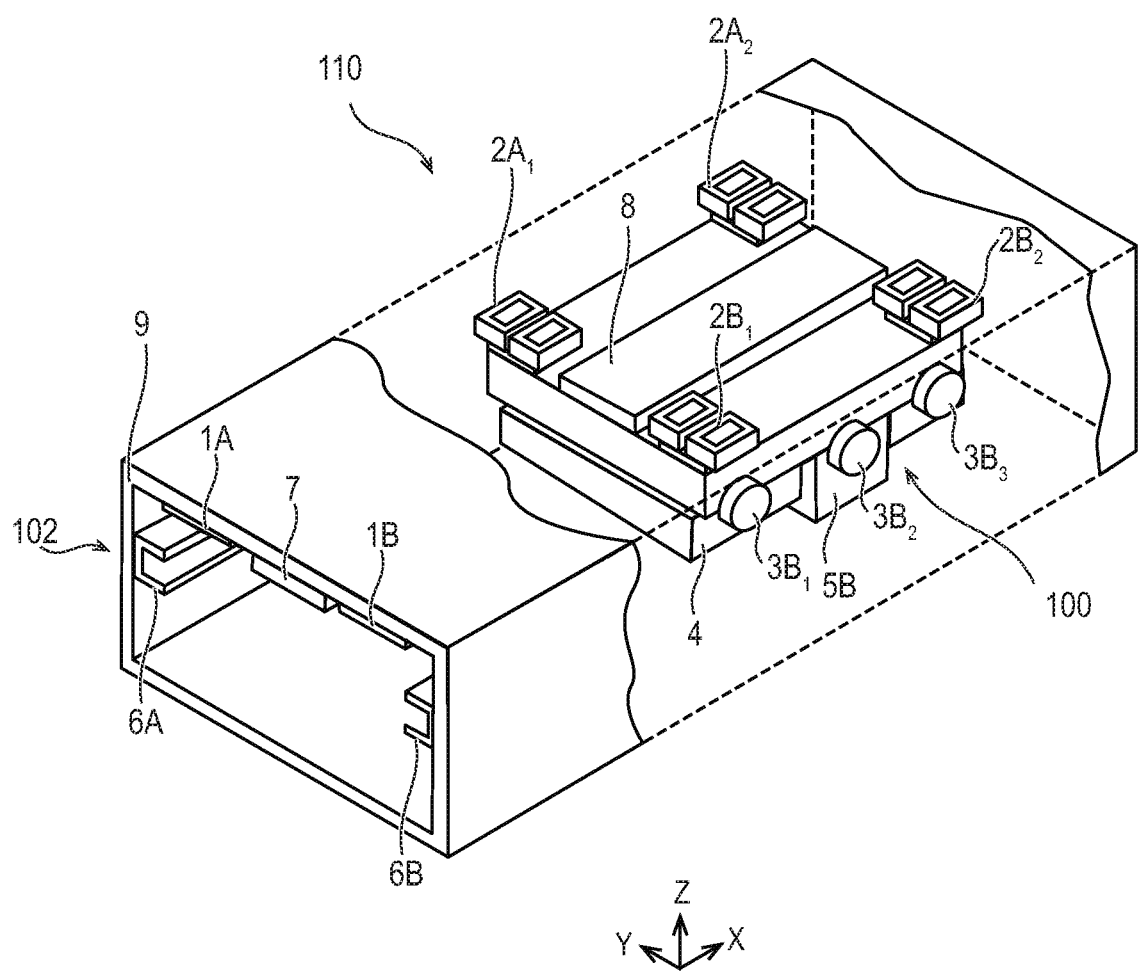
FIG. 1A and FIG. 1B are diagrams illustrating a schematic configuration of a transport system according to a first embodiment.
Figure 1B:
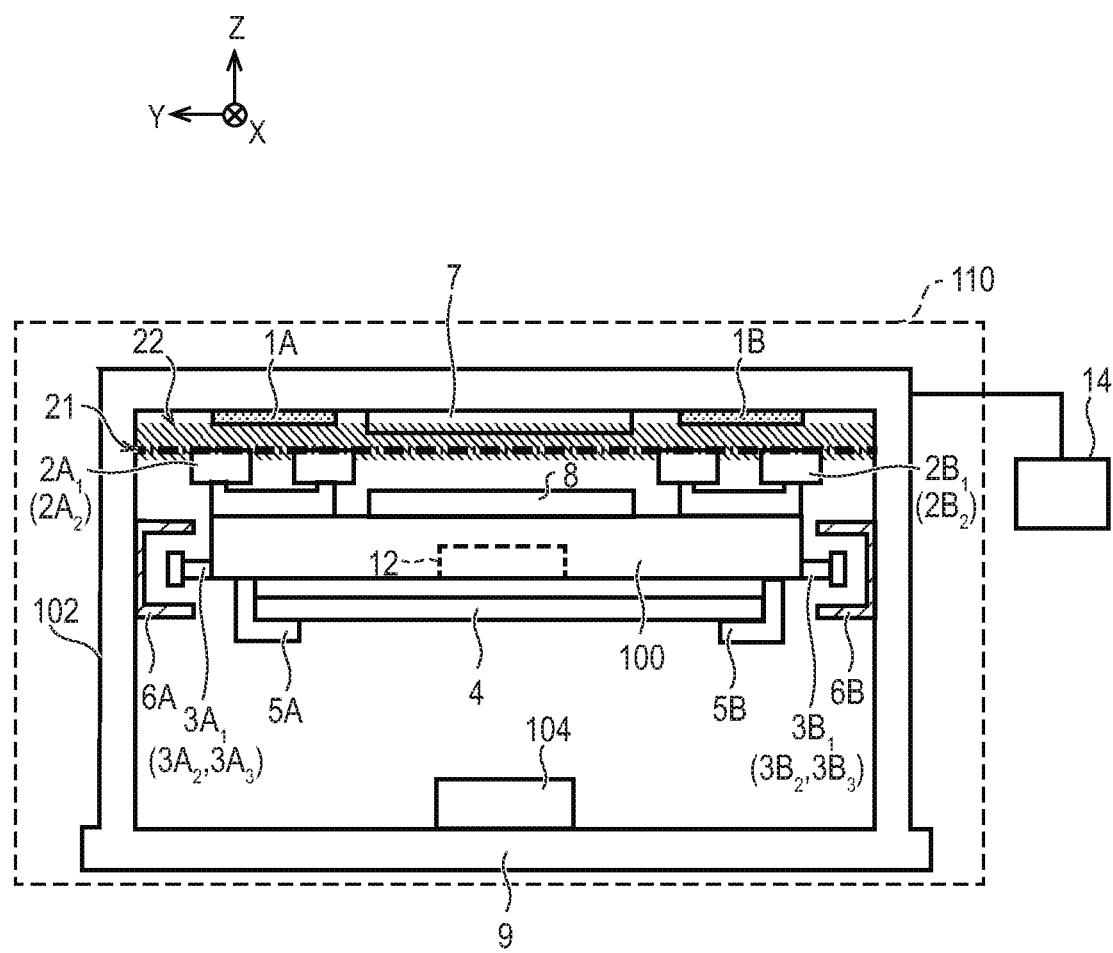

First, a schematic configuration of the transport system 110 according to the present embodiment will be described with reference to FIG. 1A and FIG. 1B. FIG. 1A is a perspective view illustrating the transport system 110 according to the present embodiment. FIG. 1B is a side view illustrating the transport system 110 according to this embodiment. The side view of FIG. 1B is a side view of the transport system 110 viewed from the X-axis direction shown in FIG. 1A. Note that, in the following description and drawings, for a plurality of identical components, only the common numerals are used when there is no particular need to distinguish between the plurality of identical components, and if necessary, the numerals are followed by alphabets in capital or small character, or further with numerals in subscript after the alphabets to distinguish each of the plurality of identical components.

As shown in FIG. 1A and FIG. 1B, the transport system 110 according to the present embodiment includes a transport vehicle 100 for holding and transporting an object 4 to be transported, a transport path apparatus 102 constituting a transport path along which the transport vehicle 100 travels, and control apparatuses 12 and 14. The transport system 110 according to the present embodiment is a magnetic levitation transport system for traveling and transporting a transport vehicle 100 in a magnetic levitation state which is levitated against gravity by magnetic force. The transport system 110 according to the present embodiment constitutes a part of a processing system including a processing apparatus 104 for processing the object 4 to be transported that is transported by the transport vehicle 100. The processing system can manufacture an article by performing processing by a processing apparatus 104.

For example, the transport system 110 transports the object 4 to be transported as a workpiece held by the transport vehicle 100 to a processing apparatus 104 for processing the object 4 to be transported by the transport vehicle 100. The processing apparatus 104 is not particularly limited, but is, for example, a film forming apparatus, such as a vapor deposition apparatus or a sputtering apparatus, that forms a film on a substrate, such as a glass substrate, as the object 4 to be transported.

Herein, coordinate axes and directions used in the following description are defined. The X axis is taken along the transport direction of the transport vehicle 100 along the horizontal direction, that is, the traveling direction of the transport vehicle 100, and the transport direction of the transport vehicle 100 is taken as the X axis direction. The Z axis is taken along a vertical direction which is a direction orthogonal to the X axis direction, and the vertical direction is taken as the Z axis direction. The direction orthogonal to the X-axis direction and the Z-axis direction is defined as the Y-axis direction. The transport direction of the transport vehicle 100 is not necessarily in the horizontal direction, but in this case, the Y-axis direction and the Z-axis direction can be similarly determined with the transport direction as the X-axis direction. Note that the X-axis direction, the Y-axis direction, and the Z-axis direction are not necessarily limited to directions orthogonal to each other, but may be defined as directions intersecting each other.

The transport path apparatus 102 includes a transport path housing 9, tracks 1A and 1B, landing transport rails 6A and 6B, and a stator 7. Further, the transport path apparatus 102 includes an up-and-down mechanism 30 described later with reference to FIG. 2A to FIG. 2D.

The transport path housing 9 has a rectangular tubular shape extending in the X-axis direction, and has a bottom plate and a top plate facing each other in the Z-axis direction, and a pair of side plates facing each other in the Y-axis direction. An internal space of the transport path housing 9 is a space in which the transport vehicle 100 travels. In the internal space of the transport path housing 9, the up-and-down mechanism 30 and the processing apparatus 104 are disposed at predetermined positions.

On the inner surface of the top plate of the transport path housing 9, strip-like tracks 1A and 1B extending along the X-axis direction are mounted to be provided. The pair of tracks 1A and 1B are mounted in parallel with each other at a predetermined interval. The tracks 1A and 1B are made of a ferromagnetic material, particularly a magnetic material of a soft magnetic material. Specifically, for example, the tracks 1A and 1B may be made of rolled steel for general structures, such as SS 400. The track 1 functions as a magnetic force unit where a magnetic force is applied between the track 1 and the coil array 2 of the transport vehicle 100.

A stator 7 of a single-sided linear induction motor is mounted to be provided on the inner surface of the top plate of the transport path housing 9 so as to extend in the X-axis direction between the track 1A and the track 1B. The stator 7 has a coil array (not shown) including a plurality of coils arranged along the X-axis direction. The plurality of coils of the stator 7 generate an electromagnetic force, which is a thrust for driving the transport vehicle 100 in the X-axis direction, between the transport vehicle 100 and a secondary conductor plate 8 described later.

Landing transport rails 6A and 6B extending in the X-axis direction are mounted to be provided on the inner surfaces of one side plate and the other side plate of the transport path housing 9, respectively. The landing transport rail 6A is a rail configured so that traveling rollers $3A_1$, $3A_2$, and $3A_3$ described later of the transport vehicle 100 in a landing state which is not in a magnetic levitation state travel. The landing transport rail 6A has a concave shape opened toward the inside of the transport path housing 9 in the Y-axis direction, and has a lower surface on which the traveling rollers $3A_1$, $3A_2$, and $3A_3$ of the transport vehicle 100 land and an upper surface facing the lower surface from the upper side. Traveling rollers $3A_1$, $3A_2$, and $3A_3$ of the transport vehicle 100 land on the lower surface of the landing transport rail 6A by gravity. Traveling rollers $3A_1$, $3A_2$, and $3A_3$ land on the upper surface of the landing transport rail 6A by magnetic force acting between the track 1 and the coil array 2. The landing transport rail 6B is a rail configured so that traveling rollers $3B_1$, $3B_2$, and $3B_3$ (described later) of the transport vehicle 100 in a landing state which is not a magnetic levitation state travel. The landing transport rail 6B has a concave shape opened toward the inside of the transport path housing 9 in the Y-axis direction, and has a lower surface on which the traveling rollers $3B_1$, $3B_2$, and $3B_3$ of the transport vehicle 100 land and an upper surface facing the lower surface from the upper side. Traveling rollers $3B_1$, $3B_2$, and $3B_3$ of the transport vehicle 100 land on the lower surface of the landing transport rail 6B by gravity. Traveling rollers $3B_1$, $3B_2$, and $3B_3$ land on the upper surface of the landing transport rail 6B by magnetic force acting between the track 1 and the coil array 2.

A transport vehicle 100 as a mover includes coil arrays $2A_1$, $2B_1$, $2A_2$, and $2B_2$, traveling rollers $3A_1$, $3B_1$, $3A_2$, $3B_2$, $3A_3$, and $3B_3$, a secondary conductor plate 8, transport chucks 5A and 5B, and a control apparatus 12. The transport vehicle 100 is configured to travel along the X-axis direction in the internal space of the transport path housing 9 in a magnetically levitated state.

The coil arrays $2A_1$, $2B_1$, $2A_2$, and $2B_2$ are mounted to be provided on the upper surface of the transport vehicle 100. The coil arrays $2A_1$ and $2A_2$ are arranged in the X-axis direction so as to be able to face the track 1A positioned above the transport vehicle 100 in the Z-axis direction. The coil arrays $2B_1$ and $2B_2$ are arranged in the X-axis direction so as to be able to face the track 1B positioned above the transport vehicle 100 in the Z-axis direction. Each of the coil arrays $2A_1$, $2B_1$, $2A_2$, and $2B_2$ includes, for example, two coils arranged so as to be aligned in the Y-axis direction. The number of coils included in each of the coil arrays $2A_1$, $2B_1$, $2A_2$, and $2B_2$ is not limited to two, and may be changed as appropriate.

The coil arrays $2A_1$, $2B_1$, $2A_2$ and $2B_2$ are driven by the control apparatus 12 in such a manner that currents flowing through the coils are controlled, respectively. When currents flow through the coil arrays $2A_1$, $2B_1$, $2A_2$, and $2B_2$ and magnetic fields are generated, each of the coil arrays $2A_1$, $2B_1$, $2A_2$, and $2B_2$ has an attractive force by electromagnetic force to the tracks 1A and 1B that the coil arrays $2A_1$, $2B_1$, $2A_2$, and $2B_2$ face. The magnetic levitation state of the transport vehicle 100 mounted with the object 4 to be transported is realized by the attractive force of the coil arrays $2A_1$, $2B_1$, $2A_2$ and $2B_2$ to the tracks 1A and 1B by which the transport vehicle 100 rises. In this way, the coil array 2 functions as a magnetic force unit in which a magnetic force acts between the track 1 and the coil array 2.

The secondary conductor plate 8 is mounted to be provided on the upper surface of the transport vehicle 100 so as to be positioned between the line of the coil arrays $2A_1$ and $2A_2$ and the line of the coil arrays $2B_1$ and $2B_2$. The secondary conductor plate 8 is provided so as to be able to face to the stator 7 positioned above the transport vehicle 100. The transport vehicle 100 travels along the X-axis direction by the thrust generated by the electromagnetic force generated between the secondary conductor plate 8 and the stator 7 while levitating.

The traveling rollers $3A_1$, $3A_2$, and $3A_3$ are mounted on the side surface of the transport vehicle 100 on the side of the landing transport rail 6A so as to be aligned in the X-axis direction, and are provided to be able to land on the lower surface of the landing transport rail 6A. The traveling rollers $3A_1$, $3A_2$, and $3A_3$ are configured to rotate along the traveling direction of the transport vehicle 100 in accordance with the traveling of the transport vehicle 100 in a landing state where the vehicle has landed on the lower surface of the landing transport rail 6A. The traveling rollers $3B_1$, $3B_2$, and $3B_3$ are mounted on the side surface of the transport vehicle 100 on the side of the landing transport rail 6B so as to be aligned in the X-axis direction, and are provided to be able to land on the lower surface of the landing transport rail 6B. The traveling rollers $3B_1$, $3B_2$, and $3B_3$ are configured to rotate along the traveling direction of the transport vehicle 100 in accordance with the traveling of the transport vehicle in a landing state where the transport vehicle 100 has landed on the lower surface of the landing transport rail 6B. Note that the number of the traveling rollers 3 is not limited to three on each side of the transport vehicle 100, and may be appropriately changed in accordance with the size of the transport vehicle 100, stability required for the transport vehicle 100, and the like.

The traveling rollers 3 are in contact with the lower surfaces of the landing transport rails 6A and 6B at the time of landing of the transport vehicle 100 in which the transport vehicle 100 is not in a magnetically levitated state. The traveling rollers 3 also serve to reduce friction in the X-axis direction with respect to the transport vehicle 100. Thus, the transport vehicle 100 can travel in the X-axis direction by the thrust acting between the stator 7 and the secondary conductor plate 8 even at the time of landing.

The transport chucks 5A and 5B are mounted to be provided on the lower surface of the transport vehicle 100. The transport chucks 5A and 5B are configured to hold the object 4 to be transported. The object 4 to be transported is not particularly limited, but is, for example, a workpiece, such as a substrate, to be processed in a processing system including the transport system 110.

In the transport system 110, magnetic fields are generated by flowing currents to the coil arrays $2A_1$, $2B_1$, $2A_2$, and $2B_2$, whereby the coil arrays $2A_1$, $2B_1$, $2A_2$, and $2B_2$ have electromagnetic attractive forces to the tracks 1A and 1B each of them face, respectively. The transport vehicle 100 can be levitated by the attractive forces of the coil arrays $2A_1$, $2B_1$, $2A_2$, and $2B_2$ to the tracks 1A and 1B. In general, since the magnetic flux density decreases as the distance between two points of a magnet and a magnetic body increases, the attractive force of the coil arrays $2A_1$, $2B_1$, $2A_2$, and $2B_2$ decreases as the distance to the tracks 1A and 1B increases.

In FIG. 1B, a levitation reference surface 21 and a levitation transport path 22 are shown. The levitation reference surface 21 indicates a surface coincident with the upper surfaces of the coil arrays $2A_1$, $2A_2$, $2B_1$, and $2B_2$ serving as a reference of the levitation position. The levitation transport path 22 is a region in the Z-axis direction having a lower limit position at a position where the gravity of the transport vehicle 100 is balanced with the attractive forces of the coil arrays $2A_1$, $2A_2$, $2B_1$, and $2B_2$ when maximum currents capable of flowing in the coil arrays $2A_1$, $2A_2$, $2B_1$, and $2B_2$ flow. The upper limit position of the levitation transport path 22 is a position of a surface coincident with the surfaces of the tracks 1A and 1B on the transport vehicle 100 side. FIG. 1B shows a positional relationship between the levitation transport path 22 and the levitation reference surface 21 of the transport vehicle 100 in a magnetically levitated state. The levitation transport path 22 is an area in which the transport vehicle 100 can be levitated when the levitation reference surface 21 is regarded as a reference. That is, the levitation transport path 22 is an area positioned at a position where the transport vehicle 100 can be levitated by the magnetic forces acting between the tracks 1 and the coil arrays 2.

As shown in FIG. 1B, in the case of the transport vehicle 100 in a magnetically levitated state, the levitation reference surface 21 is positioned so as to enter above the lower limit position of the levitation transport path 22. That is, if the levitation reference surface 21 is not positioned at the lower limit position or above the lower limit position of the levitation transport path 22, the transport system 110 cannot levitate the transport vehicle 100 because it cannot generate sufficient attractive force to the transport vehicle 100. Therefore, in order to bring the transport vehicle 100 into a magnetically levitated state, the transport vehicle 100 can be arranged so that the levitation reference surface 21 is positioned at the lower limit position or above the lower limit position of the levitation transport path 22.

The control apparatus 12 controls currents flowing in the coil arrays $2A_1$, $2A_2$, $2B_1$, and $2B_2$. Thus, the control apparatus 12 controls the levitation of the transport vehicle 100 in the Z-axis direction while controlling the buoyancy in the Z-axis direction with respect to the transport vehicle 100. A magnetic detection head (not shown) attached to the transport vehicle 100 is connected to the control apparatus 12. The magnetic detection head reads the value of a magnetic scale (not shown) provided in the transport path housing 9 and transmits the position of the transport vehicle 100 in the Z-axis direction to the control apparatus 12. The control apparatus 12 controls the currents flowing in the coil arrays $2A_1$, $2A_2$, $2B_1$, and $2B_2$ based on the position of the transport vehicle 100 in the Z-axis direction transmitted from the magnetic detection head.

On the other hand, the control apparatus 14 controls the currents flowing through the coils of the stator 7. Thus, the control apparatus 14 controls the travel of the transport vehicle 100 in the X-axis direction while controlling the thrust in the X-axis direction with respect to the transport vehicle 100. The control apparatus 14 is connected to a plurality of linear encoders (not shown) arranged in line in the transport path apparatus 102 in the X-axis direction. Each linear encoder reads a linear scale (not shown) of the transport vehicle 100 and outputs a relative position of the transport vehicle 100 with respect to each encoder to the control apparatus 14. The control apparatus 14 has a coordinate table showing the X coordinate of each linear encoder. The control apparatus 14 calculates the position of the transport vehicle 100 in the X-axis direction based on the output from the linear encoder and the X-coordinate of the linear encoder, and controls the currents flowing to the coils of the stator 7 based on the position. It is to be noted that a control apparatus capable of controlling both the control apparatus 12 and the control apparatus 14 may be provided separately.

In this way, the transport system 110 controls the currents flowing through the coil arrays $2A_1$, $2A_2$, $2B_1$, and $2B_2$ by the control apparatus 12, and controls the currents flowing through the coils of the stator 7 by the control apparatus 14, thereby causing the transport vehicle 100 to travel in the X-axis direction while levitating the transport vehicle 100 in the Z-axis direction and transport it.

For example, in automated factories, magnetic levitation transport systems have been used to transport objects quickly and quietly. In a magnetic levitation transport system, a magnetic force is used as a levitation force for levitating a transport vehicle holding an object to be transported.

In a magnetic levitation transport system, in general, when an emergency stop button is depressed or a serious failure occurs during travel of the transport vehicle, the drive power supply is stopped by the safety device of the magnetic levitation transport system. Then, the attractive force of the coil for raising the transport vehicle disappears, and the transport vehicle lands on the lower surface of the transport path in the gravity direction, or the transport vehicle lands on the upper surface of the transport path by the attractive force of the permanent magnet of the transport vehicle. In order to perform the levitation control by taking off the transport vehicle again from the landing state of the transport vehicle, the transport vehicle is manually pushed up from the lower surface the transport vehicle lands on, and the transport vehicle is peeled off from the upper surface the transport vehicle lands on. In addition, the same operation as described above also occurs when the vehicle is fed into or discharged from the transport path of the magnetic levitation transport system.

Japanese Patent Application Laid-Open No. H10-95533 discloses a structure in which a transport vehicle attracted to a guide rail is moved to a position where the attracting force is reduced by an external force such as a handle, a gear mechanism, or an electromagnet as a technique for returning the transport vehicle to a magnetic levitation state. However, in the structure of Japanese Patent Application Laid-Open No. H10-95533, while it is difficult to take off the transport vehicle from the lower surface transport vehicle lands on as described above, there is a possibility that the cost of the apparatus increases due to a mechanism for peeling the transport vehicle from the upper surface transport vehicle lands on.

In contrast, the transport system 110 according to the present embodiment further includes the up-and-down mechanism 30 as moving means for taking off the transport vehicle 100. In the present embodiment, the up-and-down mechanism 30 facilitates the takeoff of the transport vehicle 100 to be levitated while keeping the cost of the apparatus low.

Hereinafter, the specific structure and the takeoff operation of the up-and-down mechanism 30 as the moving means for taking off the transport vehicle 100 in the transport system 110 according to the present embodiment will be described with reference to FIG. 2A to FIG. 2D. FIG. 2A to FIG. 2D are diagrams showing the specific structure of the up-and-down mechanism 30 and the takeoff operation, respectively. FIG. 2A to FIG. 2D are side views of the transport system 110 including the up-and-down mechanism 30, respectively, as viewed in the Y-axis direction. In FIG. 2A to FIG. 2D, the landing transport rail 6 is omitted for ease of understanding. Similarly, the landing transport rail 6 is omitted in FIG. 3A and subsequent drawings.

As shown in FIG. 2A to FIG. 2D, the transport system 110 includes a up-and-down mechanism 30. In the transport path housing 9 of the transport path apparatus 102, one up-and-down mechanism 30 may be provided at one specific location, or a plurality of up-and-down mechanisms 30 may be provided at a plurality of different locations in the X-axis direction.

The up-and-down mechanism 30 is configured to be able to support the transport vehicle 100 from below. The up-and-down mechanism 30 has a shape capable of supporting the transport vehicle 100 without contacting the transport chucks 5A and 5B provided on the lower surface of the transport vehicle 100 and the object 4 to be transported held by the transport chucks 5A and 5B.

The up-and-down mechanism 30 includes a drive unit 31 that drives in the Z-axis direction. The drive unit 31 is provided on the bottom plate of the transport path housing 9 and has a torque capable of lifting the transport vehicle 100 in a landing state in the Z-axis direction. By the drive unit 31, the up-and-down mechanism 30 can move the transport vehicle 100 in the Z-axis direction while supporting the transport vehicle 100 to lift the transport vehicle 100. In the up-and-down mechanism 30, the height in the Z-axis direction, the driving range in the Z-axis direction of the drive unit 31, and the like are adjusted so that the position of the levitation reference surface 21 in the Z-axis direction moves to the region of the levitation transport path 22 when the transport vehicle 100 is lifted.

The up-and-down mechanism 30 is connected to the control apparatus 14. The control apparatus 14 controls the drive of the up-and-down mechanism 30 in the Z-axis direction by the drive unit 31. The up-and-down mechanism 30 may be connected to a control apparatus separate from the control apparatus 14, and the drive of the up-and-down mechanism 30 may be controlled by the control apparatus separate from the control apparatus 14.

The operation of taking off the transport vehicle 100 by the up-and-down mechanism 30 will be described with reference to FIG. 2A to FIG. 2D. The control of the up-and-down mechanism 30 for performing the series of operations shown in FIG. 2A to FIG. 2D is performed by the control apparatus 14, but may alternatively be performed by a separate and independent control apparatus.

Figure 2A:
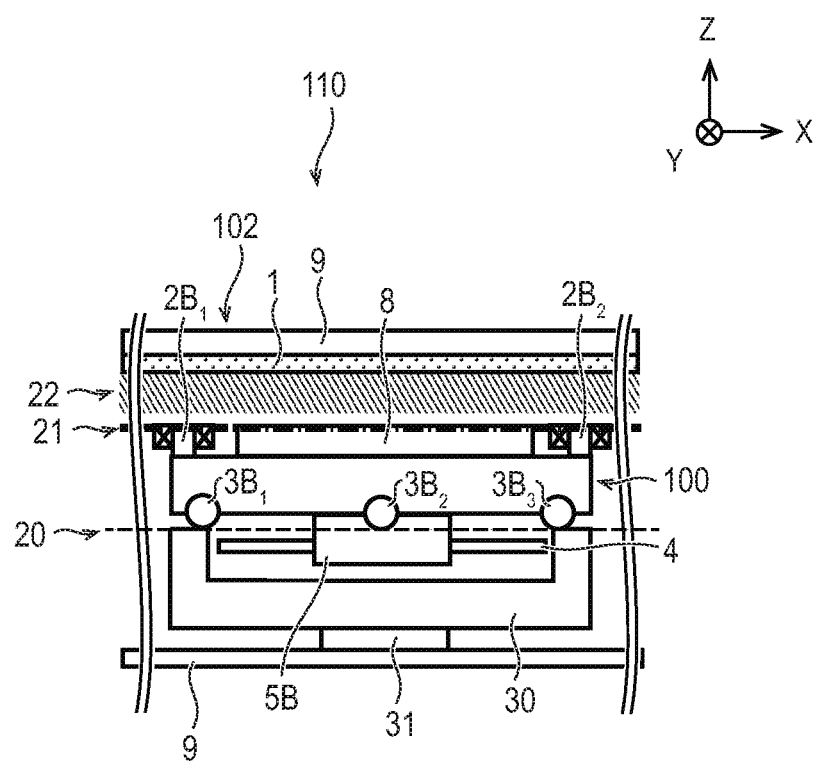
FIG. 2A, FIG. 2B, FIG. 2C, and FIG. 2D are diagrams illustrating a specific structure of an up-and-down mechanism as moving means and takeoff operation in the transport system according to the first embodiment.

First, as shown in FIG. 2A, the transport vehicle 100 in a landing state where the transport vehicle 100 has landed on the landing transport path 20 is placed at a position above the up-and-down mechanism 30 in a state before moving up. The landing transport path 20 is a track of the lower ground surface of the traveling roller 3 formed by the lower surface of the landing transport rails 6. As a method of placing the transport vehicle 100 at a position above the up-and-down mechanism 30, for example, a method of automatically traveling and placing the transport vehicle 100 in a landing state by a program of a control apparatus 14 included in the transport system 110 or another control apparatus can be used. Similarly, as the placing method, for example, a method of manually transporting and placing the transport vehicle 100 can be used.

Figure 2B:
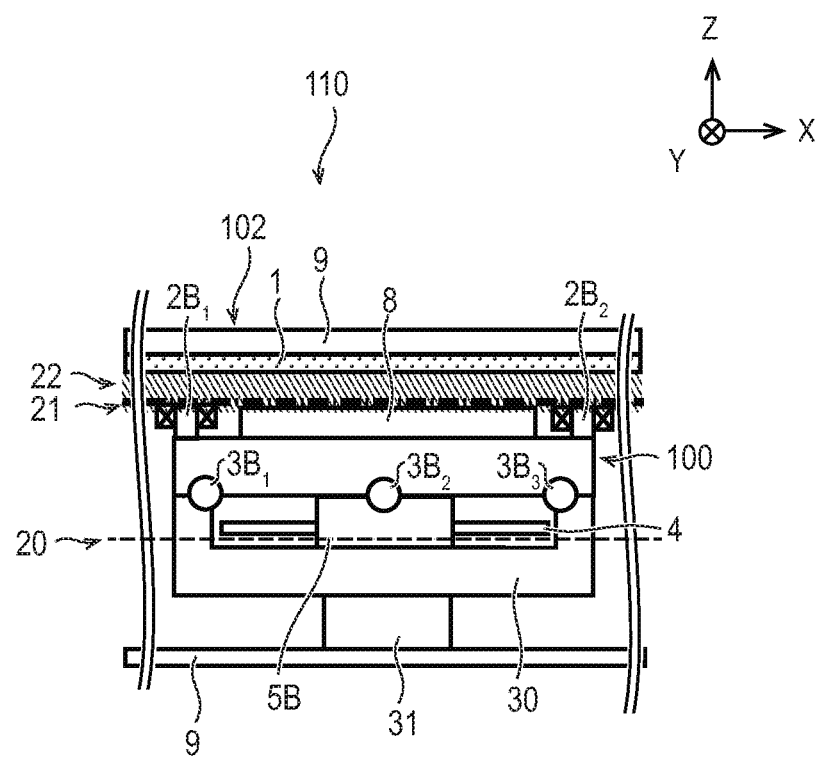

Next, as shown in FIG. 2B, the up-and-down mechanism 30 moves up in the Z-axis direction by the drive unit 31 to lift the transport vehicle 100 from below. Thus, the transport vehicle 100 moves in the Z-axis direction to move up. When the transport vehicle 100 moves up, the traveling roller 3 is separated from the landing transport path 20.

Figure 2C:
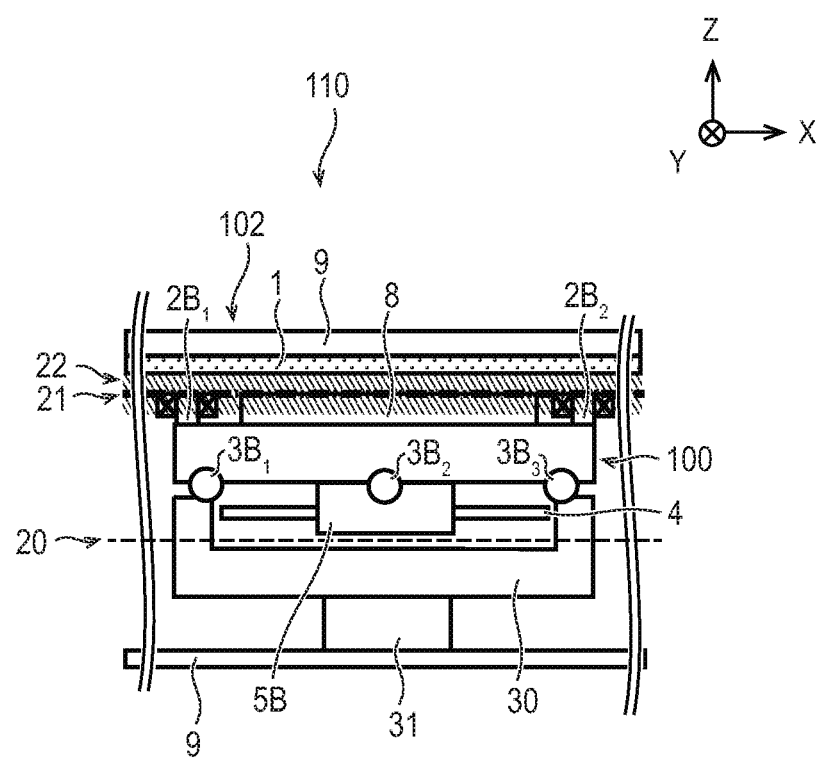

When the transport vehicle 100 moves up by the up-and-down mechanism 30, as shown in FIG. 2C, the levitation reference surface 21 of the transport vehicle 100 enters the levitation transport path 22. Thus, the up-and-down mechanism 30 moves the transport vehicle 100 to a position where the transport vehicle can levitate by the magnetic force acting between the tracks 1 and the coil arrays 2. The control apparatus 12 flows currents to the coil arrays 2 to control the levitation force acting on the transport vehicle 100 so that the transport vehicle 100, in which the levitation reference surface 21 has entered the levitation transport path 22, is brought into the magnetic levitation state. The control apparatus 12 may flow currents to the coil arrays 2 at a predetermined time point after the time point when the levitation reference surface 21 enters the levitation transport path 22, or may flow currents to the coil arrays 2 in advance before the levitation reference surface 21 enters the levitation transport path 22. Thus, the transport vehicle 100 takes off in a state where the levitation reference surface 21 enters the levitation transport path 22 by receiving the levitation force, and becomes the magnetically levitated state.

Figure 2D:
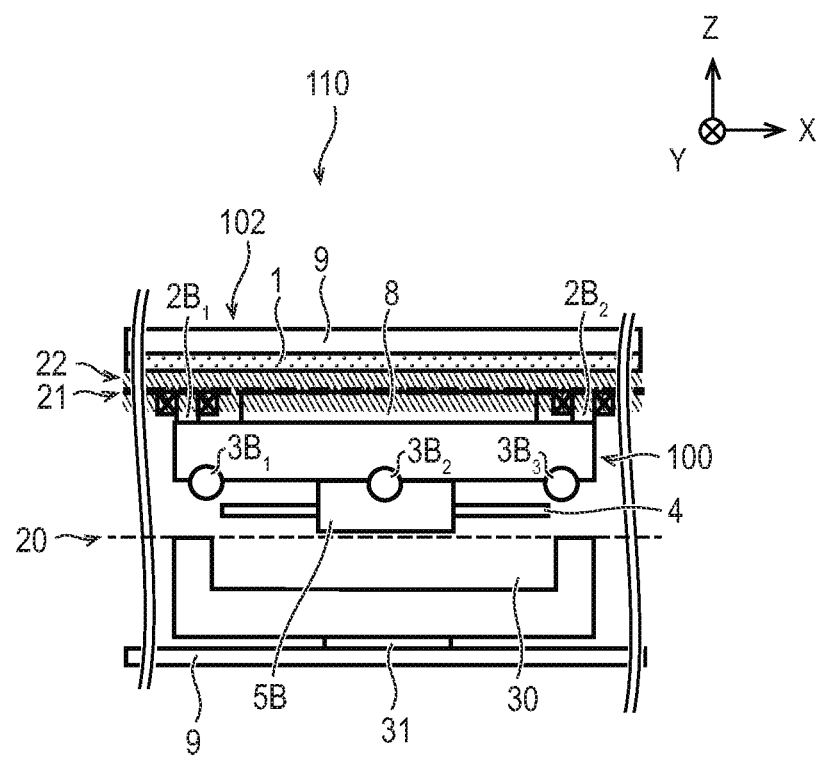

Next, as shown in FIG. 2D, after the transport vehicle 100 takes off, the up-and-down mechanism 30 moves down in the Z-axis direction by the drive unit 31 and separates from the transport vehicle 100. The up-and-down mechanism 30 moves down to a position where the up-and-down mechanism 30 does not come into contact with the transport vehicle 100 including the transport chuck 5 and the object 4 to be transported in the magnetically levitated state. Thus, the up-and-down mechanism 30 moves down, whereby the transport vehicle 100 can travel on the levitation transport path 22 without contacting the up-and-down mechanism 30. The control apparatus 14 controls the thrust acting on the transport vehicle 100 by passing currents to the coils of the stator 7, thereby allowing the transport vehicle 100 in the magnetically levitated state to travel along the levitation transport path 22 in the X-axis direction to transport the transport vehicle 100.

By the above operation, the transport vehicle 100 is moved from the landing transport path 20 to the levitation transport path 22, and thus the takeoff of the transport vehicle 100 can be realized.

As described above, according to the present embodiment, the transport vehicle 100 is taken off by the up-and-down mechanism 30 having a simple structure provided in the transport path apparatus 102. Therefore, according to the present embodiment, it is possible to realize the takeoff of the transport vehicle 100 to be levitated while keeping the cost of the apparatus low.

Second Embodiment

A transport system 110 according to a second embodiment will be described with reference to FIG. 3A to FIG. 3H. Note that the same components as those in the first embodiment described above are labeled with the same reference numerals and the description thereof will be omitted or simplified.

The basic configuration of the transport system 110 according to this embodiment is substantially the same as that according to the first embodiment. The transport system 110 according to the present embodiment includes a receiving mechanism 51, an elevating mechanism 52, and a slide mechanism 55 as moving means for taking off the transport vehicle 100 in place of the up-and-down mechanism 30. The transport system 110 may include the receiving mechanism 51, the elevating mechanism 52, and the slide mechanism 55 in addition to the configuration of the first embodiment.

Hereinafter, the specific structures and the takeoff operation of the receiving mechanism 51, the elevating mechanism 52, and the slide mechanism 55, which are moving means for taking off the transport vehicle 100 in the transport system 110 according to the present embodiment, will be described with reference to FIG. 3A to FIG. 3H. FIG. 3A to FIG. 3H show the specific structures of the receiving mechanism 51, the elevating mechanism 52, and the slide mechanism 55, respectively, and the takeoff operation. FIG. 3A to FIG. 3H are side views of the transport system 110 including the receiving mechanism 51, the elevating mechanism 52, and the slide mechanism 55, respectively, as viewed in the Y-axis direction.

As shown in FIG. 3A to FIG. 3H, the transport system 110 according to the present embodiment includes a slide mechanism 55. The transport system 110 according to the present embodiment further includes a receiving mechanism 51 and an elevating mechanism 52 in order to realize the takeoff of the transport vehicle 100 even when the landing transport path 20 and the levitation transport path 22 are separated in the X-axis or the Z-axis direction. One set of the receiving mechanism 51, the elevating mechanism, and the slide mechanism may be provided at one specific location, or a plurality of sets of the receiving mechanism 51, the elevating mechanism 52, and the slide mechanism 55 may be provided at a plurality of different locations in the X-axis direction, in the transport path apparatus 102.

The receiving mechanism 51 and the slide mechanism 55 are provided so as to be aligned in the X-axis direction in the transport path apparatus 102. The slide mechanism 55 is provided at a position higher than the receiving mechanism 51 in the Z-axis direction. The end of the slide mechanism 55 on the side of the receiving mechanism 51 overlaps the end of the receiving mechanism 51 on the side of the slide mechanism 55. The elevating mechanism 52 is provided at a position where the end of the slide mechanism 55 and the end of the receiving mechanism 51 overlap in the transport path apparatus 102. The landing transport rails 6A and 6B are not provided at the position where the receiving mechanism 51, the elevating mechanism 52 and the slide mechanism 55 are provided in the transport path apparatus 102. Further, in the transport path apparatus 102, the tracks 1A and 1B are not provided at the position where the elevating mechanism 52 is provided.

The receiving mechanism 51 includes a drive unit 50 that drives in the X-axis direction. The height of the drive unit 50 in the Z-axis direction is adjusted so as to drive along the landing transport path 20. The receiving mechanism 51 is configured to be capable of receiving the transport vehicle 100 in a landing state mounted on the upper surface of the drive unit 50 at the receiving position. The drive unit 50 can drive in a state in which the transport vehicle 100 in a landing state is mounted on the upper surface thereof, and has a torque capable of moving the transport vehicle 100 in the X-axis direction. The drive unit 50 allows the receiving mechanism 51 to move the transport vehicle 100 received at the receiving position in the X-axis direction to a transferring position where the transport vehicle 100 is transferred to the elevating mechanism 52. The receiving mechanism 51 includes an encoder (not shown) for specifying and obtaining the current position of the drive unit 50 in the X-axis direction.

The elevating mechanism 52 is configured to be capable of supporting the transport vehicle 100 transferred from the receiving mechanism 51 from below. The elevating mechanism 52 has a shape capable of supporting the transport vehicle 100 without contacting the transport chucks 5A and 5B provided on the lower surface of the transport vehicle 100 and the object 4 to be transported held by the transport chucks 5A and 5B.

The elevating mechanism 52 includes a drive unit 53 that drives in the Z-axis direction. The drive unit 53 is provided on the bottom plate of the transport path housing 9 and has a torque capable of lifting the transport vehicle 100 in a landing state in the Z-axis direction. By the drive unit 53, the elevating mechanism 52 can move in the Z-axis direction while supporting the transport vehicle 100 to lift the transport vehicle 100.

Further, in the elevating mechanism 52, the height in the Z-axis direction, the driving range in the Z-axis direction of the drive unit 53, and the like are adjusted so that the position in the Z-axis direction of the levitation reference surface 21 moves to the region corresponding to the levitation transport path 22 when the transport vehicle 100 is lifted. The elevating mechanism 52 includes an encoder (not shown) for specifying and acquiring the current position of the drive unit 53 in the Z-axis direction.

The receiving mechanism 51 is configured with the end portion overlapping with the drive unit 50 and the slide mechanism 55 and other portions so as not to interfere with the operation of the elevating mechanism 52. The slide mechanism 55 is also configured with a drive unit 54 (described later), the end portion overlapping with the receiving mechanism 51, and other portions so as not to interfere with the operation of the elevating mechanism 52.

The slide mechanism 55 includes a drive unit 54 that drives in the X-axis direction. The slide mechanism 55 is configured so as to be able to receive the transport vehicle 100 in the landing state, which is lifted by the elevating mechanism 52, mounted on the upper surface of the drive unit 54. The slide mechanism 55 can receive the transport vehicle 100 mounted on the upper surface of the drive unit 54 while maintaining the position of the transport vehicle 100 in the Z-axis direction. The drive unit 54 can drive in a state in which the transport vehicle 100 in the landing state is mounted on the upper surface thereof, and has a torque capable of moving the transport vehicle 100 in a landing state in the X-axis direction. Further, in the drive unit 54, the height in the Z-axis direction, the driving range in the X-axis direction, and the like are adjusted so that when the transport vehicle 100 is moved, the position in the X-axis direction of the levitation reference surface 21 is moved to the region of the levitation transport path 22. The slide mechanism 55 includes an encoder (not shown) for specifying and acquiring the current position of the drive unit 54 in the X-axis direction.

The receiving mechanism 51 is connected to the control apparatus 14. The control apparatus 14 controls the drive of the drive unit 50 in the X-axis direction. The control apparatus 14 can acquire the current position of the drive unit 50 in the X-axis direction and move the drive unit 50 to a predetermined position in the X-axis direction. The receiving mechanism 51 may be connected to a control apparatus separate from the control apparatus, and the drive of the receiving mechanism 51 may be controlled by the control apparatus separate from the control apparatus 14.

The elevating mechanism 52 is connected to the control apparatus 14. The control apparatus 14 controls the drive of the elevating mechanism 52 in the Z-axis direction by the drive unit 53. The control apparatus 14 can acquire the current position of the drive unit 53 from the elevating mechanism 52 and move the drive unit 53 to a predetermined position in the Z-axis direction. The elevating mechanism 52 may be connected to a control apparatus separate from the control apparatus 14, and the drive of the elevating mechanism 52 may be controlled by the control apparatus separate from the control apparatus 14.

The slide mechanism 55 is connected to the control apparatus 14. The control apparatus 14 controls the drive of the drive unit 54 in the X-axis direction. The control apparatus 14 can acquire the current position of the drive unit 54 from the slide mechanism 55 and move the drive unit 54 to a predetermined position in the X-axis direction. The slide mechanism 55 may be connected to a control apparatus separate from the control apparatus 14, and the drive of the slide mechanism 55 may be controlled by the control apparatus separate from the control apparatus 14.

The operation of taking off the transport vehicle 100 by the receiving mechanism 51, the elevating mechanism 52, and the slide mechanism 55 will be described with reference to FIG. 3A to FIG. 3F. The control of the receiving mechanism 51, the elevating mechanism 52, and the slide mechanism 55 for performing the series of operations shown in FIG. 3A to FIG. 3F is performed by the control apparatus 14, but may alternatively be performed by a separate and independent control apparatus.

Figure 3A:
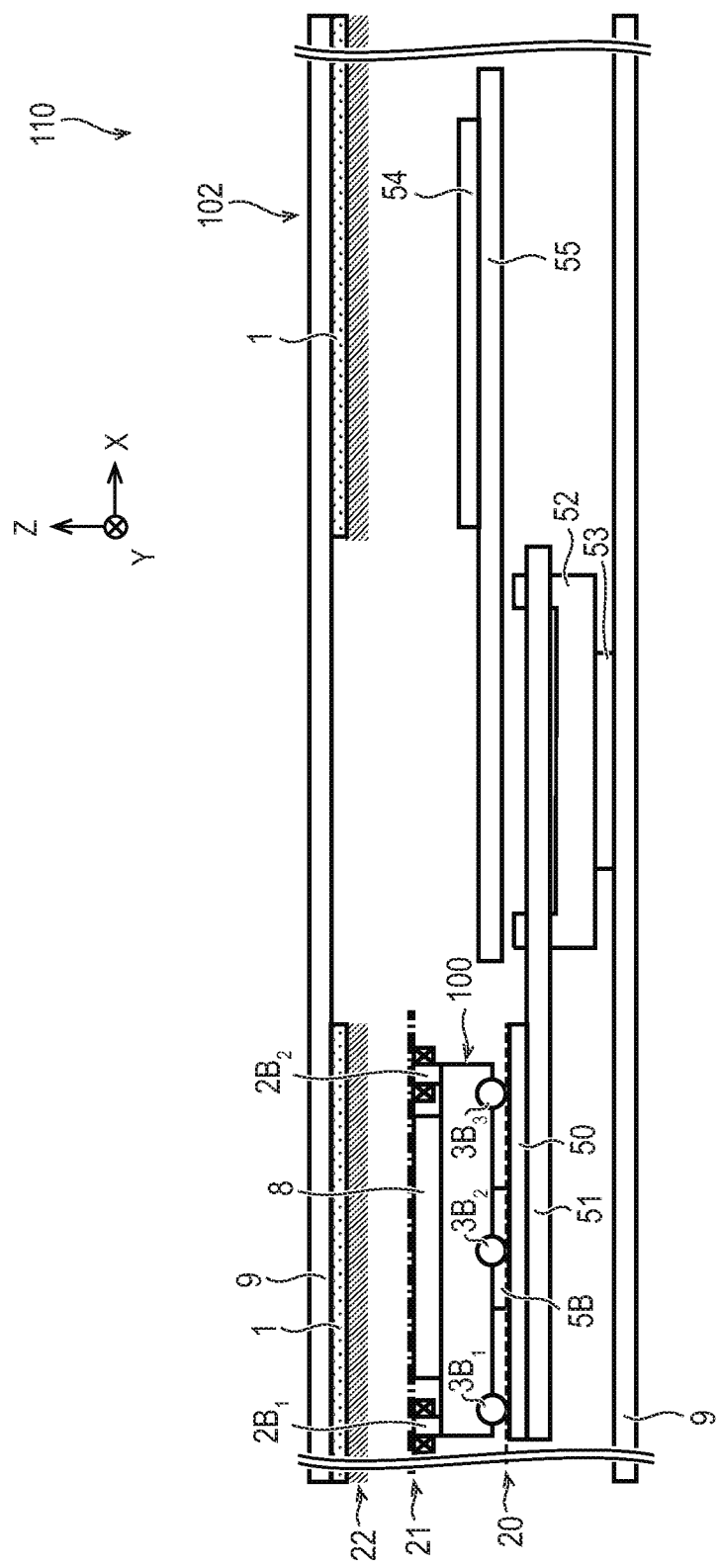
FIG. 3A, FIG. 3B, FIG. 3C, FIG. 3D, FIG. 3E, FIG. 3F, FIG. 3G, and FIG. 3H are diagrams illustrating a specific structure of a slide mechanism as moving means and takeoff operation in a transport system according to a second embodiment.

First, as shown in FIG. 3A, the transport vehicle 100 in a landing state where the transport vehicle 100 has landed on the landing transport path 20 is placed at the receiving position of the receiving mechanism 51 to be mounted on the upper surface of the drive unit 50. As a method of placing the transport vehicle 100 at the receiving position of the receiving mechanism 51, for example, a method of automatically traveling and placing the transport vehicle 100 in a landing state by a program of a control apparatus 14 included in the transport system 110 or another control apparatus can be used. Similarly, as the placing method, for example, a method of manually transporting and placing the transport vehicle 100 can be used.

Figure 3B:
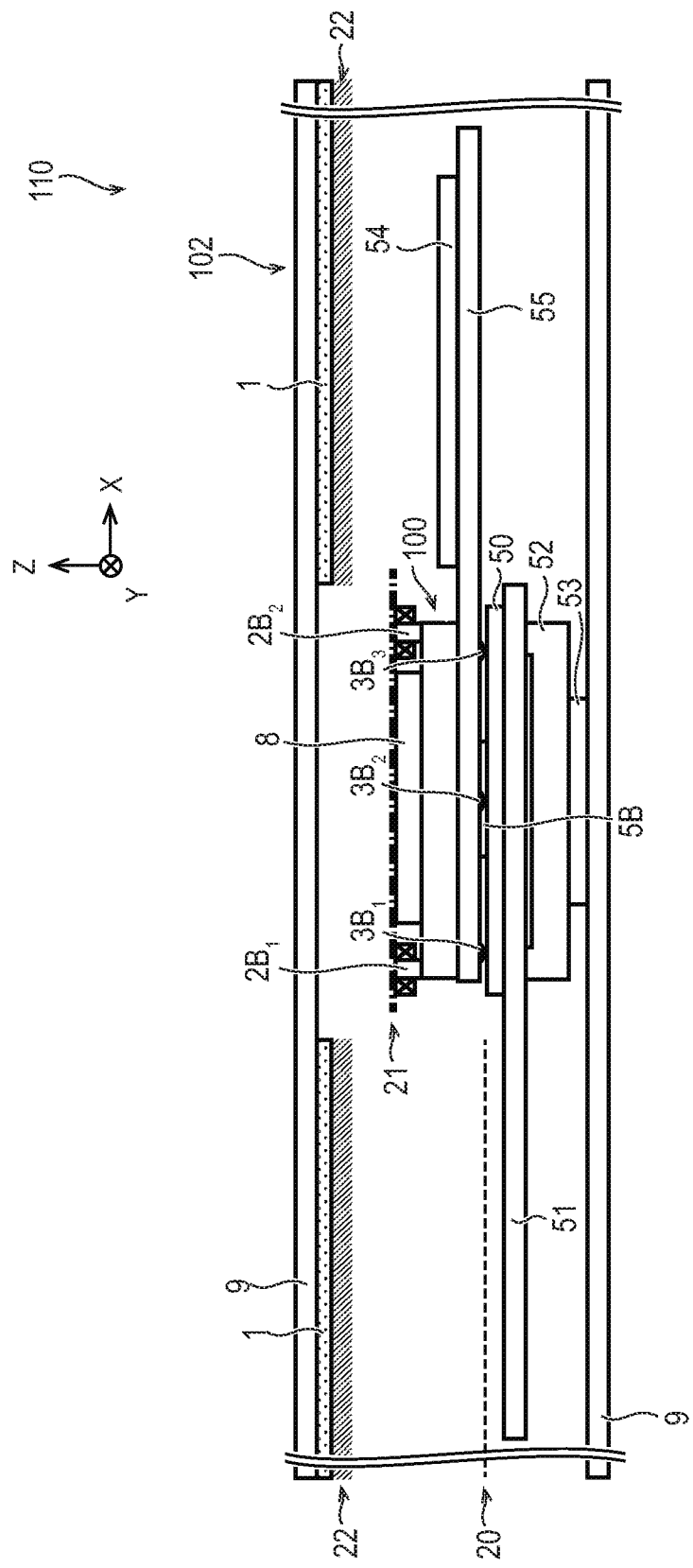

When the receiving mechanism 51 receives the transport vehicle 100 in the landing state mounted on the upper surface of the drive unit 50 at the receiving position, as shown in FIG. 3B, the receiving mechanism 51 makes the drive unit 50, mounted with the transport vehicle 100 in the landing state, drive in the X-axis direction. As a result, the receiving mechanism 51 moves the drive unit 50 on which the transport vehicle 100 is mounted to the transfer position where the transport vehicle 100 is transferred to the elevating mechanism 52. The receiving mechanism 51 transfers the transport vehicle 100 to the elevating mechanism 52 at the transferring position.

Figure 3C:
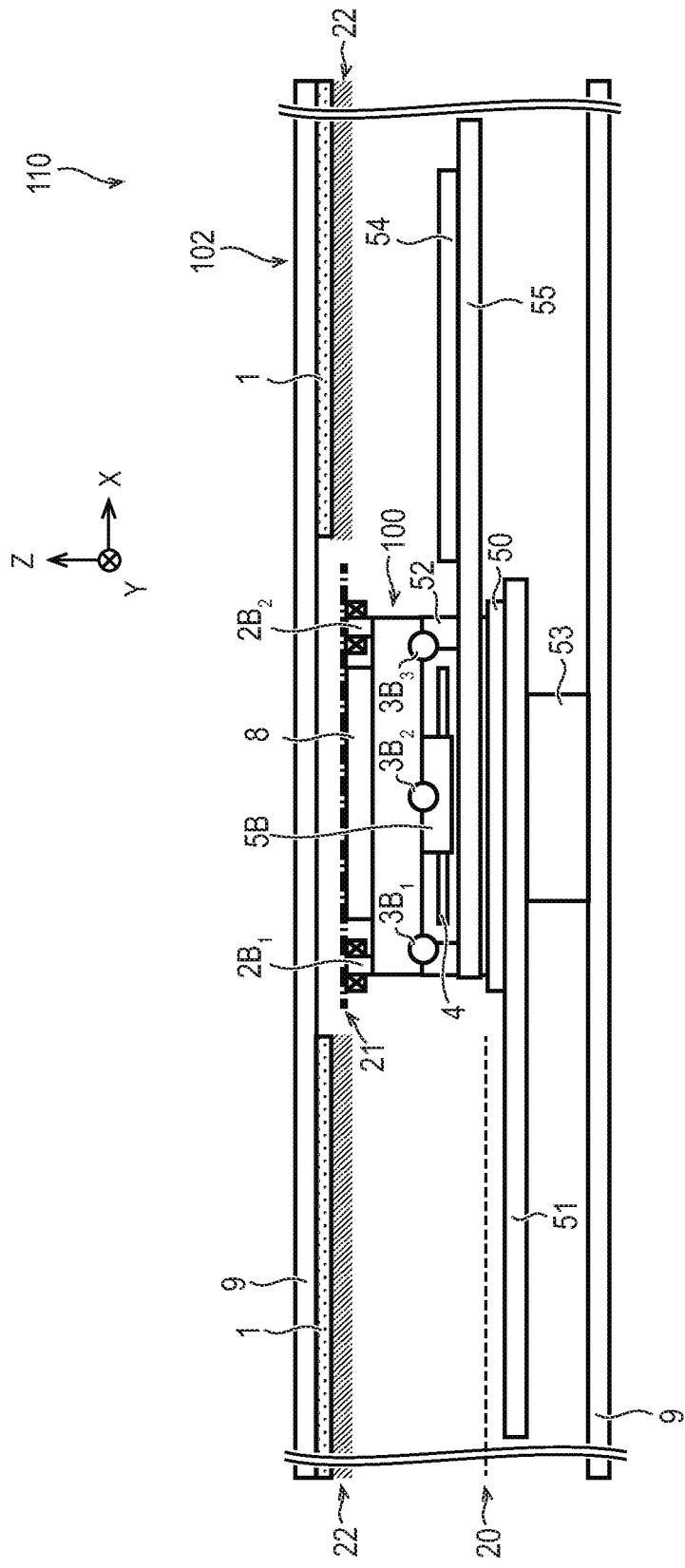

Next, as shown in FIG. 3C, the elevating mechanism 52 receives the transport vehicle 100 from the receiving mechanism 51, and moves up in the Z-axis direction while supporting the transport vehicle 100 from below. Thus, the elevating mechanism 52 lifts the transport vehicle 100 from below and moves the transport vehicle 100 in the Z-axis direction until the position of the levitation reference surface 21 in the Z-axis direction moves to an area corresponding to the levitation transport path 22.

Figure 3D:
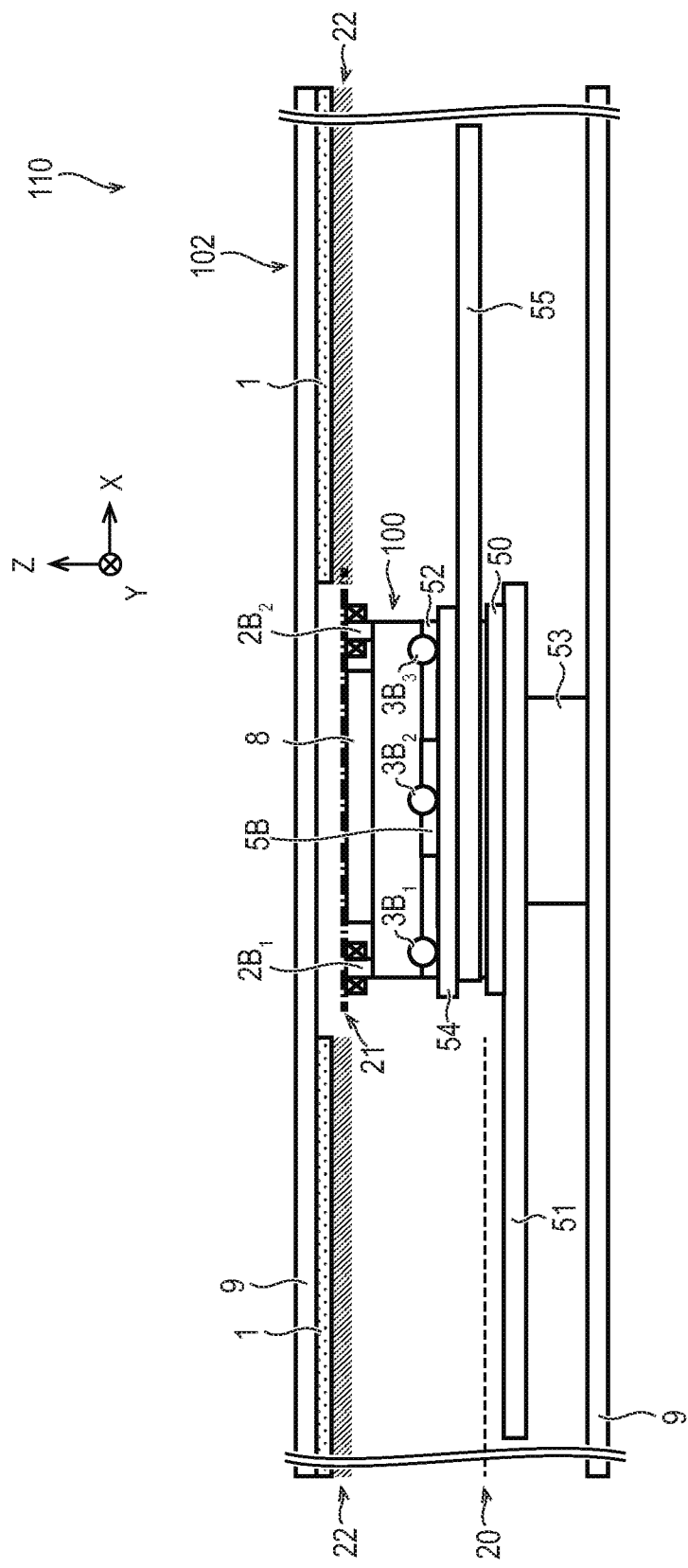

Next, as shown in FIG. 3D, the slide mechanism 55 mounts and receives the transport vehicle 100, which has been moved up in the Z-axis direction by the elevating mechanism 52, on the upper surface of the drive unit 54 while maintaining the position of the transport vehicle 100 in the Z-axis direction.

Figure 3E:
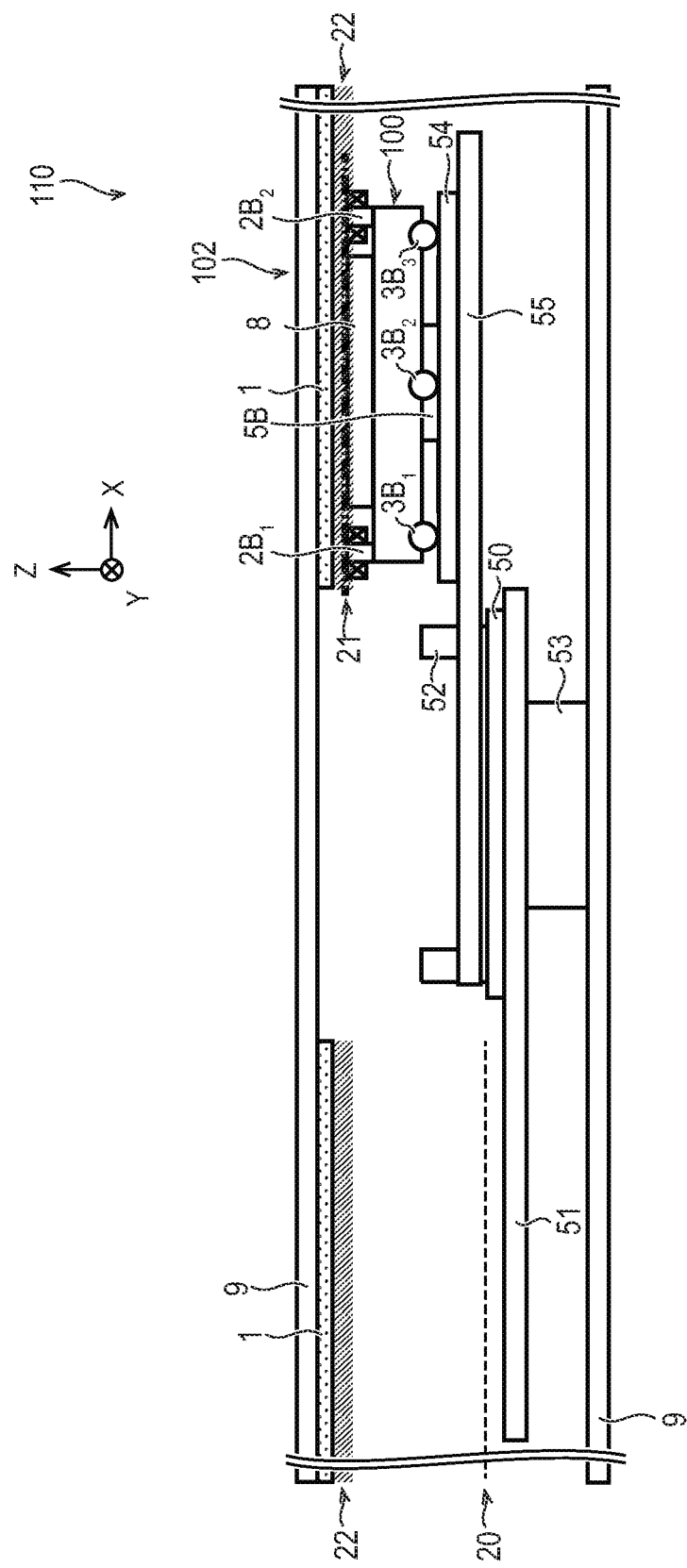

Next, as shown in FIG. 3E, the slide mechanism 55 drives the drive unit 54 on which the transport vehicle 100 is mounted in the X-axis direction. Thus, the slide mechanism 55 sends the transport vehicle 100 received from the elevating mechanism 52 to the levitation transport path 22. Then, the levitation reference surface 21 of the transport vehicle 100 enters the levitation transport path 22. When the levitation reference surface 21 has entered the levitation transport path 22, the transport vehicle 100 becomes in a state capable of taking off by the levitation force. Thus, the slide mechanism 55 moves the transport vehicle 100 to a position where it can be levitated by the magnetic force acting between the tracks 1 and the coil arrays 2.

Figure 3F:
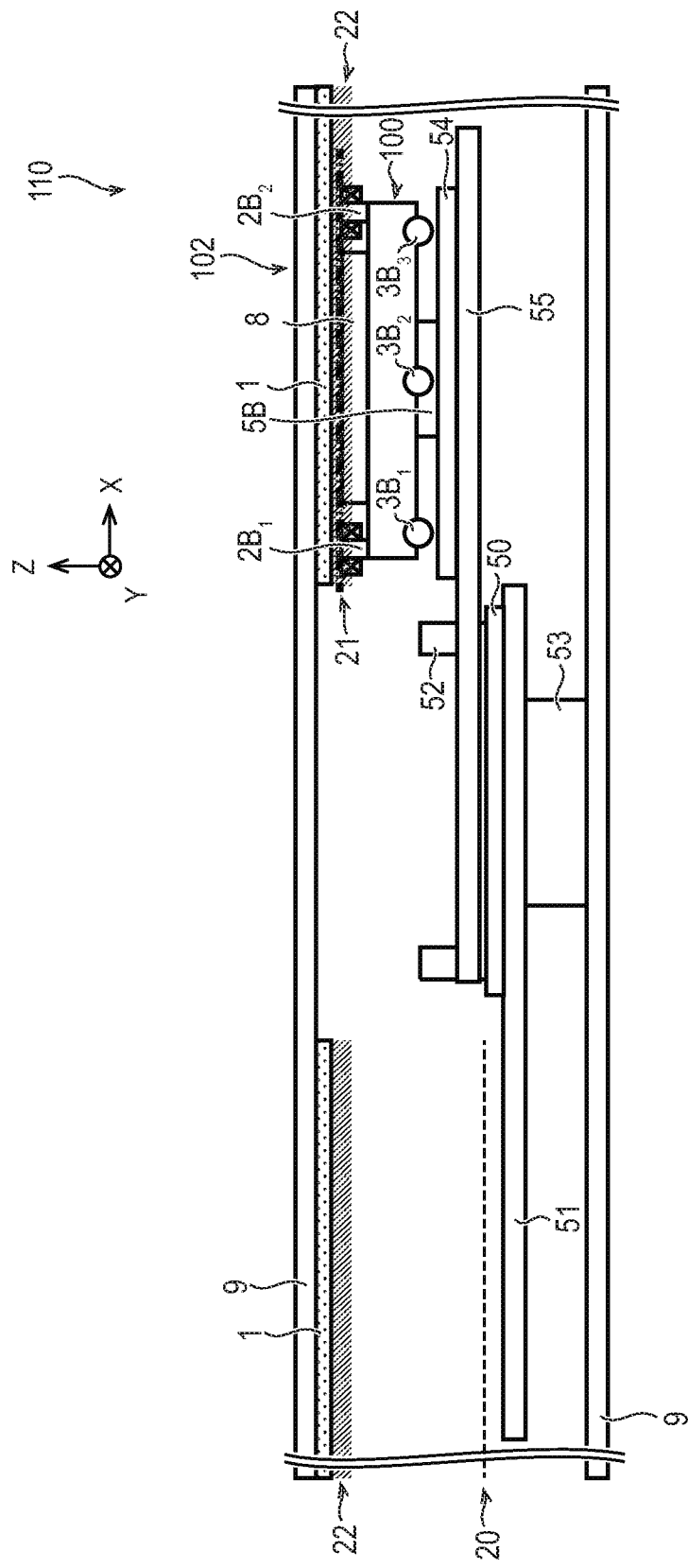

Next, the control apparatus 12 flows currents to the coil arrays 2 to control the levitation force acting on the transport vehicle 100 so that the transport vehicle 100, in which the levitation reference surface 21 has entered the levitation transport path 22, is brought into the magnetically levitated state. Then, as shown in FIG. 3F, the transport vehicle 100 takes off by receiving the levitation force, and enters the magnetically levitated state. Thereafter, the control apparatus 14 controls the thrust acting on the transport vehicle 100 by flowing currents to the coils of the stator 7, thereby allowing the transport vehicle 100 in the magnetically levitated state to travel along the levitation transport path 22 in the X-axis direction to transport the transport vehicle 100.

By the above operation, the transport vehicle 100 is moved from the landing transport path 20 to the levitation transport path 22, and thus the takeoff of the transport vehicle 100 can be realized.

As described above, according to the present embodiment, the transport vehicle 100 is taken off by the receiving mechanism 51, the elevating mechanism 52, and the slide mechanism 55 each having a simple structure provided in the transport path apparatus 102. Therefore, according to the present embodiment, it is possible to realize the takeoff of the transport vehicle 100 to be levitated while keeping the cost of the apparatus low.

Figure 3G:
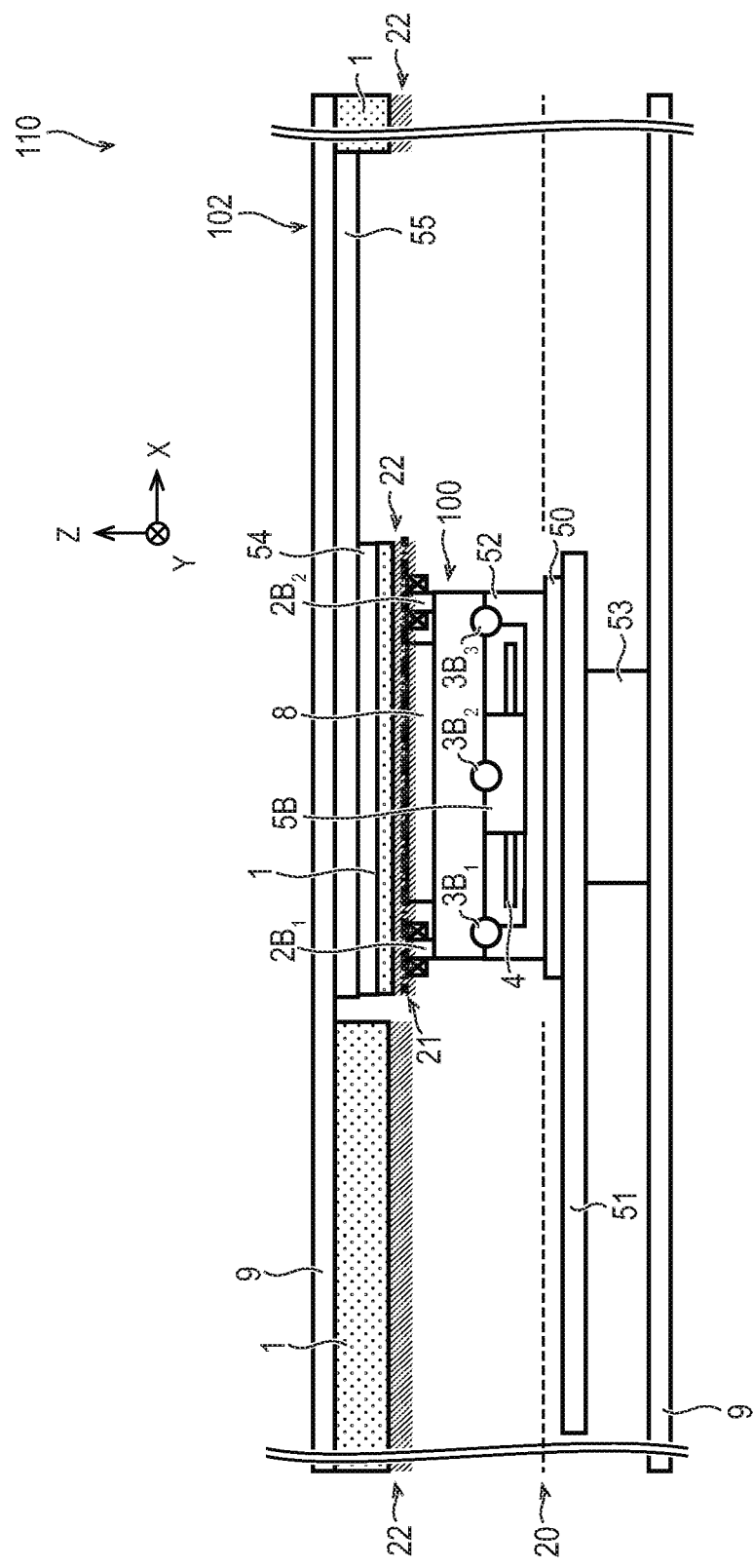

As shown in FIG. 3G, the slide mechanism 55 may be mounted on the inner surface of the top plate of the transport path housing 9, and the tracks 1 may be mounted on the drive unit 54. In this case, when the drive unit 54 moves in the X-axis direction, the tracks 1 and the associated levitation transport path 22 move in the X-axis direction. The drive unit 54 can move in the X-axis direction to the side of the elevating mechanism 52 to position the tracks 1 and the associated levitation transport path 22 above the elevating mechanism 52. Further, the drive unit 54 can move in the X-axis direction to the side opposite to the elevating mechanism 52, and can connect the tracks 1 provided in the drive unit 54 to other tracks 1 on the side opposite to the elevating mechanism 52.

When the elevating mechanism 52 lifts the transport vehicle 100 from below and moves the transport vehicle 100 in the Z-axis direction with the levitation transport path 22 positioned above the elevating mechanism 52, the levitation reference surface 21 of the transport vehicle 100 enters the levitation transport path 22. When the levitation reference surface 21 has entered the levitation transport path 22, the transport vehicle 100 becomes in a state capable of taking off by the levitation force. The control apparatus 12 controls the levitation force acting on the transport vehicle 100 in the same manner as described above to take off the transport vehicle 100 and bring it into the magnetically levitated state.

Figure 3H:
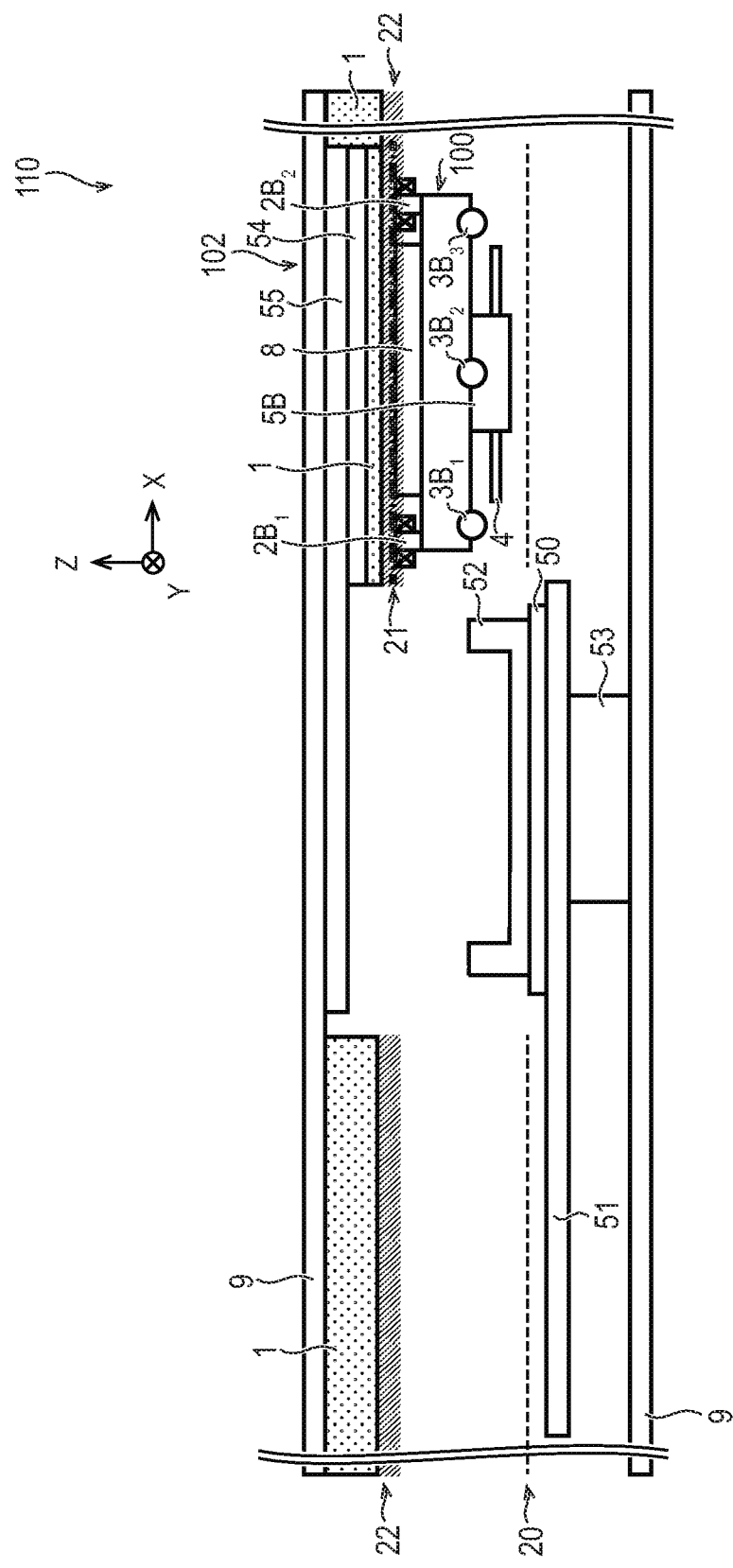

When the transport vehicle 100 has been in the magnetically levitated state, as shown in FIG. 3H, the slide mechanism 55 moves the drive unit 54 in the X-axis direction to the side opposite to the elevating mechanism 52 to connect the tracks 1 of the drive unit 54 to other tracks 1. The transport vehicle 100 in the magnetically levitated state moves in the X-axis direction together with the drive unit 54 by the attractive force between the coil arrays 2 and the tracks 1 of the drive unit 54. Thereafter, the control apparatus 14 controls the thrust acting on the transport vehicle 100 in the same manner as described above, so that the control apparatus 14 can make the transport vehicle 100 in the magnetically levitated state travel along the levitation transport path 22 in the X-axis direction and transfer the transport vehicle 100.

Third Embodiment

A transport system 110 according to a third embodiment will be described with reference to FIG. 4A to FIG. 4D. Note that the same components as those in the first and second embodiments described above are labeled with the same reference numerals and the description thereof will be omitted or simplified.

The basic configuration of the transport system 110 according to the present embodiment is substantially the same as that according to the first embodiment. The transport system 110 according to the present embodiment includes slopes 60A and 60B as moving means for taking off the transport vehicle 100 in place of the up-and-down mechanism 30. The transport system 110 may include the slopes 60A and 60B in addition to the configuration of the first embodiment or the configuration of the second embodiment. The transport system 110 may include the slopes 60A and 60B in addition to the combination of the configurations of the first embodiment and the second embodiment.

Hereinafter, the specific structures and the takeoff operation of the slopes 60A and 60B, which are moving means for taking off the transport vehicle 100 in the transport system 110 according to the present embodiment, will be described with reference to FIG. 4A to FIG. 4D. FIG. 4A to FIG. 4D are diagrams showing the specific structures of the slopes 60A and 60B and the takeoff operation, respectively. FIG. 4A to FIG. 4D are side views of the transport system 110 including the slopes 60A and 60B as viewed in the Y-axis direction.

As shown in FIG. 4A to FIG. 4D, the transport system 110 according to the present embodiment includes slopes 60A and 60B provided in the lower surfaces of the landing transport rails 6 provided on the inner surfaces of the side plates of the transport path housing 9. The slopes 60A and 60B are similarly provided in the landing transport rails 6A and 6B, respectively. The slope 60A is a slope inclined to gradually approach the track 1, and the slope 60B is a slope inclined to gradually leave the track 1 with respect to the transport vehicle 100 traveling on the lower surfaces of the landing transport rails 6 toward one side of the X-axis direction.

The lower surface of the landing transport rail 6 between the slope 60A and the slope 60B is a flat surface 62 parallel to the X-axis direction. The flat surface 62 is higher in the Z-axis direction than the lower surface of the landing transport rail 6 outside the slopes 60A and 60B. The height of the flat surface 62 in the Z-axis direction is a height at which the levitation reference surface 21 of the transport vehicle 100 landing on the flat surface 62 enters the levitation transport path 22. That is, the flat surface 62 is located at a position where the transport vehicle 100 can be levitated by the magnetic forces acting between the tracks 1 and the coil arrays 2. The slopes 60A and 60B are provided so as to be inclined to the side of the flat surface 62, that is, to the side of the position where the transport vehicle 100 can be levitated.

The slopes 60A and 60B have, as inclination angles with respect to the X-axis direction, angles at which the transport vehicle 100 traveling in the X-axis direction can climb up and down in a landing state in which the transport vehicle 100 has landed on the lower surfaces of the landing transport rails 6, respectively. The inclination angles of the slopes 60A and 60B may be the same or different from each other.

The upper surface of the landing transport rail 6 is disposed at a position higher in the Z-axis direction than the flat surface 62 so as to face the lower surface of the landing transport rail 6 including the slopes 60A and 60B and the flat surface 62. Since the upper surface of the landing transport rail 6 is disposed at a position higher than the flat surface 62 in the Z-axis direction, the takeoff of the transport vehicle 100 is not prevented.

In the transport system 110 according to the present embodiment, the transport vehicle 100 travels on the lower surfaces of the landing transport rails 6 each including the slopes 60A and 60B in a landing state, thereby changing the height of the levitation reference surface 21 to take off the transport vehicle 100. The operation of taking off the transport vehicle 100 by the slope 60 will be described with reference to FIG. 4A to FIG. 4D.

Figure 4A:
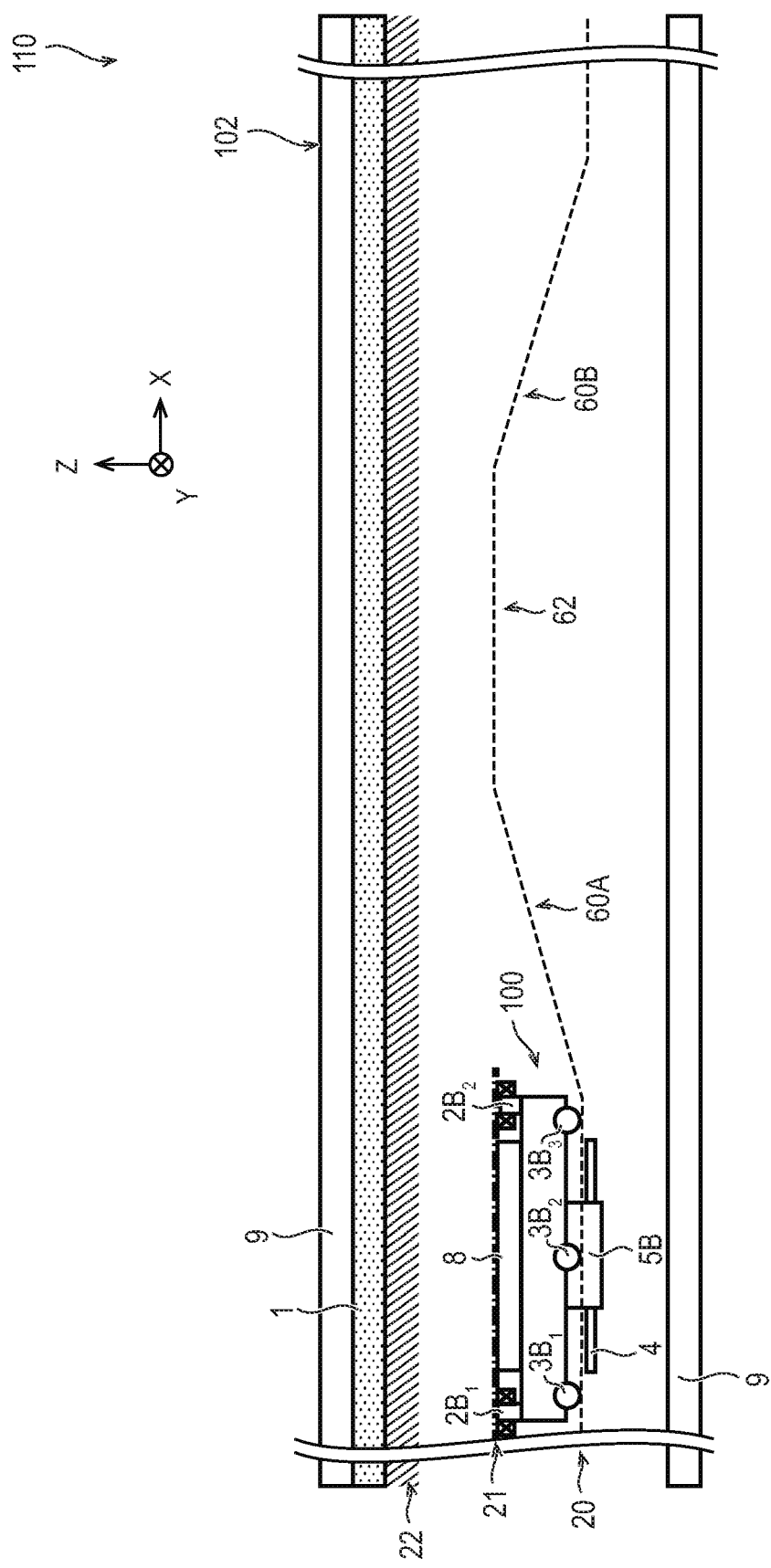
FIG. 4A, FIG. 4B, FIG. 4C, and FIG. 4D are diagrams illustrating a specific structure of a slope as moving means and takeoff operation in a transport system according to a third embodiment.

First, as shown in FIG. 4A, the transport vehicle 100 is placed at a position immediately before the slope 60A in a landing state where the transport vehicle 100 has landed on the landing transport path 20. As a method of placing the transport vehicle 100 at the position immediately before the slope 60A, for example, a method of automatically traveling and placing the transport vehicle 100 in a landing state by a program of a control apparatus 14 included in the transport system 110 or another control apparatus can be used. Similarly, as the placing method, for example, a method of manually transporting and placing the transport vehicle 100 can be used.

Figure 4B:
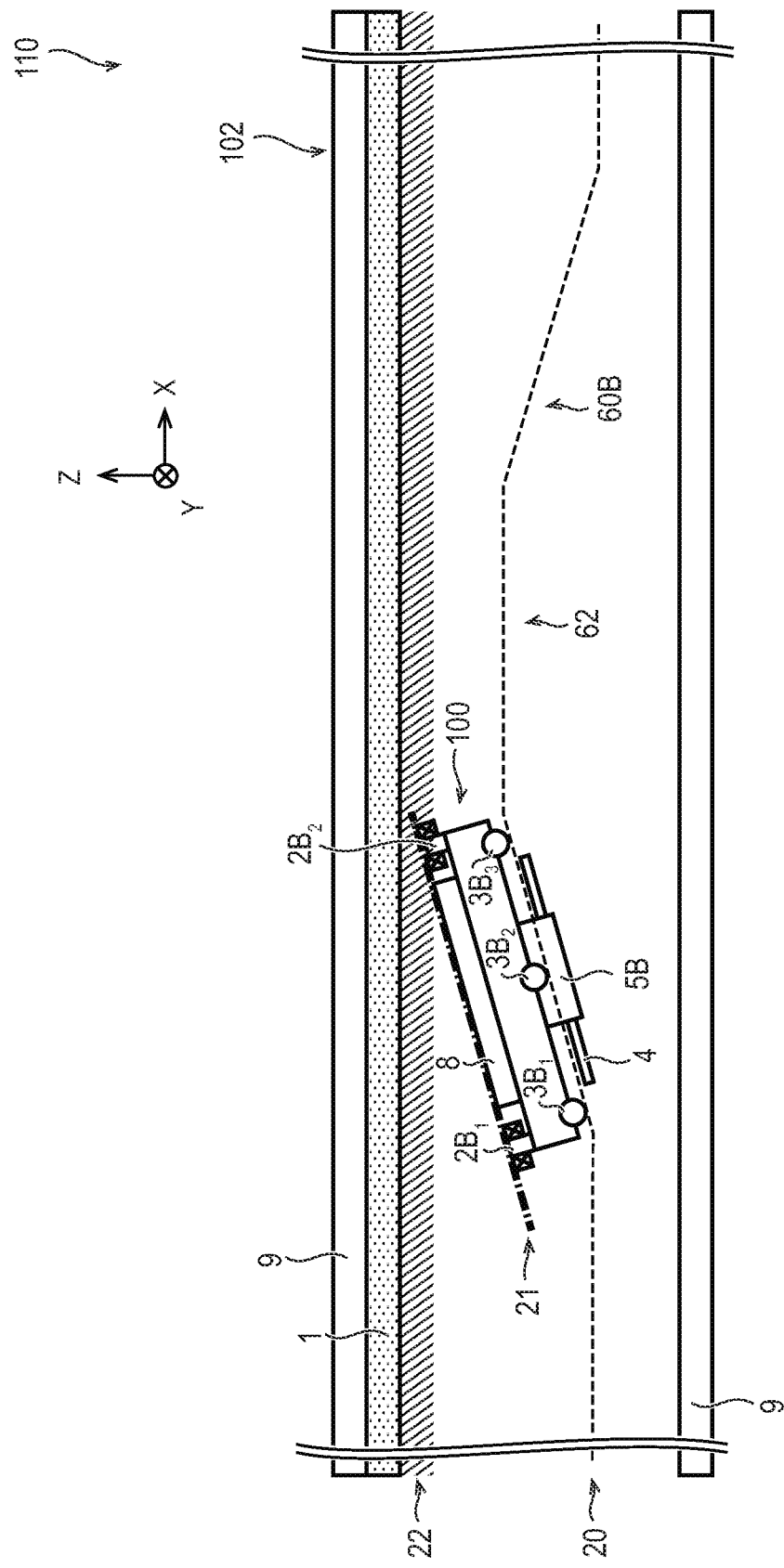

Next, as shown in FIG. 4B, the control apparatus 14 flows currents to the coils of the stator 7 to control the thrust acting on the transport vehicle 100, thereby causing the transport vehicle 100 in the landing state to travel toward the slope 60A in the X-axis direction. As a result, the transport vehicle 100 travels along the slope 60A and gradually approaches the tracks 1, and moves up the levitation reference surface 21 while leaving the landing transport path 20.

Figure 4C:
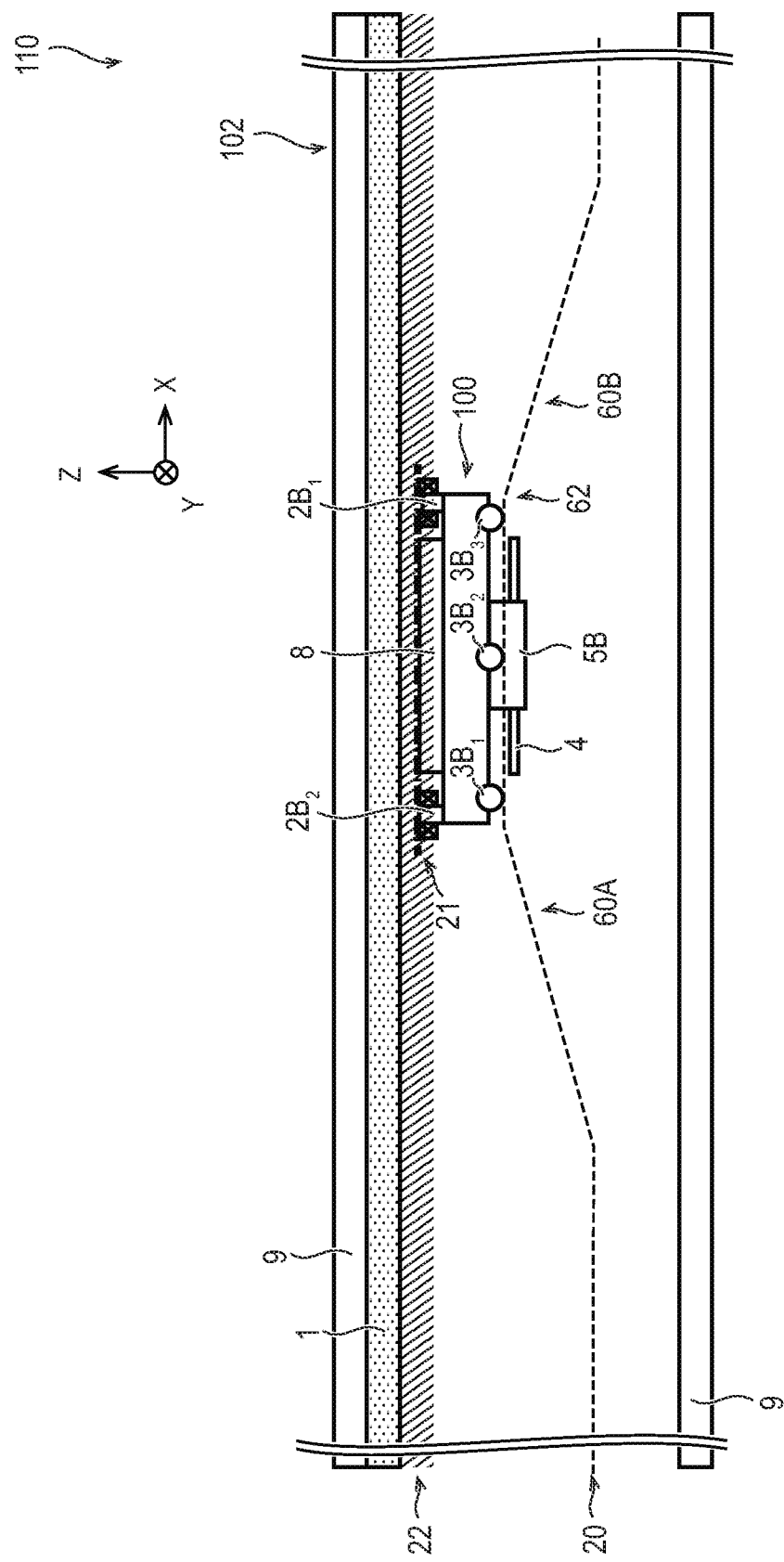

Next, as shown in FIG. 4C, the transport vehicle 100 travels on the slope 60A to reach the flat surface 62 and is guided to the elevated position. When the transport vehicle 100 is guided to the elevated position, the levitation reference surface 21 of the transport vehicle 100 enters the levitation transport path 22. When the levitation reference surface 21 has entered the levitation transport path 22, the transport vehicle 100 becomes in a state capable of taking off by the levitation force. Thus, the transport vehicle 100 travels on the slope 60A and moves to a position where the transport vehicle 100 can be levitated by the magnetic forces acting between the tracks 1 and the coil arrays 2. When the transport vehicle 100 is ready to take off, the control apparatus 12 flows currents to the coil arrays 2 to control the levitation force acting on the transport vehicle 100 so that the transport vehicle 100 is in a magnetically levitated state. Then, the transport vehicle 100 receives the levitation force to take off, and enters the magnetically levitated state.

Figure 4D:
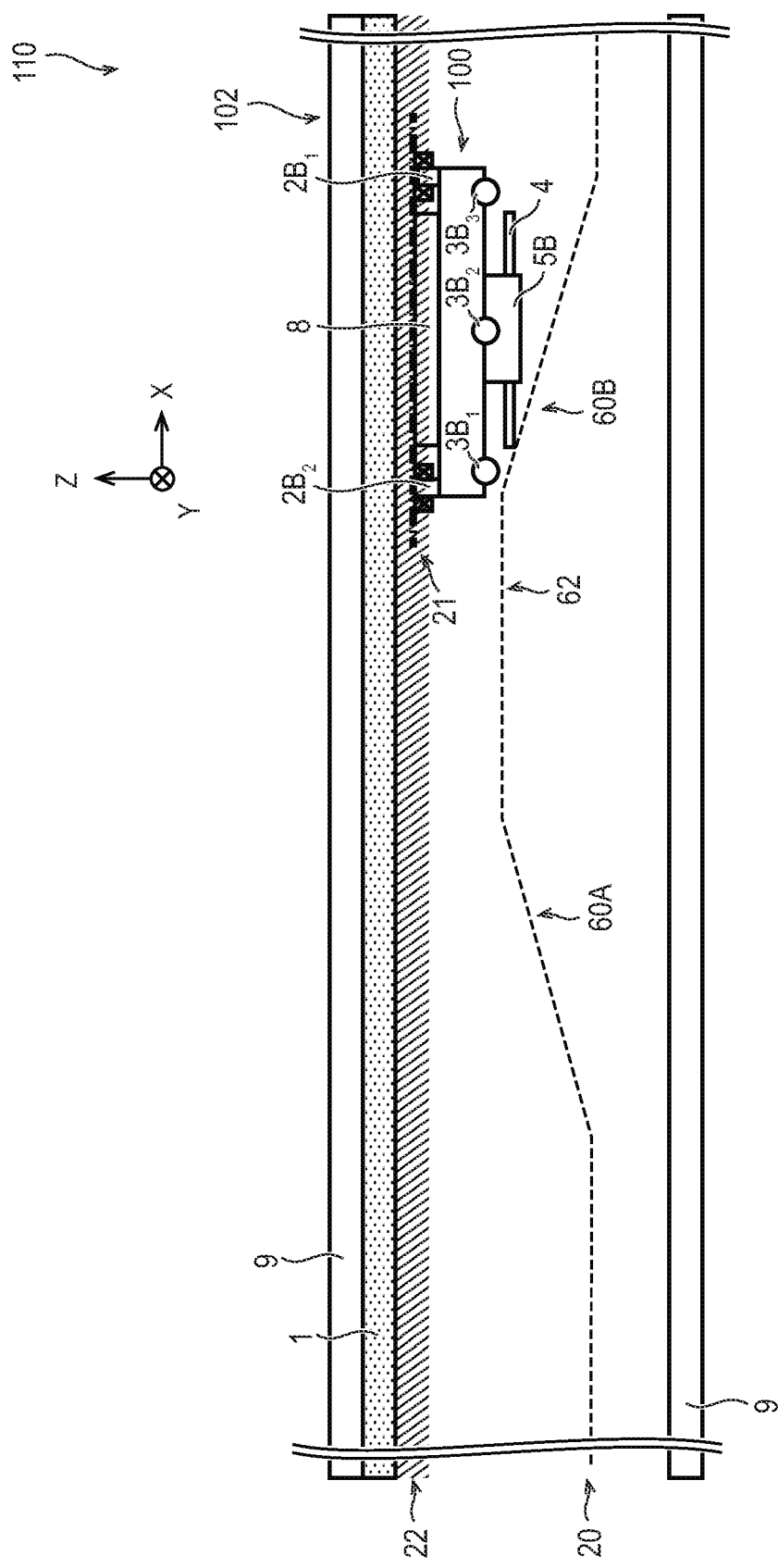

Next, as shown in FIG. 4D, the control apparatus 14 flows currents to the coils of the stator 7 to control the thrust acting on the transport vehicle 100, thereby causing the transport vehicle 100 in the magnetically levitated state to travel along the levitation transport path 22 to transport the transport vehicle 100. Although the slope 60B is disposed toward the landing transport path 20, the transport vehicle 100 does not travel on the slope 60B and does not move to the landing transport path 20 because the transport vehicle 100 takes off in the magnetically levitated state.

It should be noted that the slope 60 is only required to be disposed so that the transport vehicle 100 in a landing state can travel and the levitation reference surface 21 can enter the levitation transport path 22, and the slope 60 is not limited to that disposed as described above. For example, when the transport vehicle 100 travels in one direction as described above, it is sufficient to provide the slope 60A, and the slope 60B is not necessarily provided. The slope 60B can function as a slope for taking off the transport vehicle 100 in the same manner as the slope 60A when the transport vehicle 100 travels in the opposite direction to the above. Further, for example, the slope 60 may have a stepped shape in which an inclined surface and a flat surface are combined.

By the above operation, the transport vehicle 100 is moved from the landing transport path 20 to the levitation transport path 22, and the takeoff of the transport vehicle 100 can be realized.

As described above, according to the present embodiment, the transport vehicle 100 is taken off by the slope 60 having a simple structure provided on the landing transport rail 6 of the transport path apparatus 102. Therefore, according to the present embodiment, it is possible to realize the takeoff of the transport vehicle 100 to be levitated while keeping the cost of the apparatus low.

Fourth Embodiment

A transport system 110 according to a fourth embodiment will be described with reference to FIG. 5A to FIG. 5D. Note that the same components as those in the first to third embodiments described above are labeled with the same reference numerals and the description thereof will be omitted or simplified.

The basic configuration of the transport system 110 according to the present embodiment is substantially the same as that according to the first embodiment. The transport system 110 according to the present embodiment includes a raising and lowering mechanism 70 as moving means for taking off the transport vehicle 100 in place of the up-and-down mechanism 30. The transport system 110 may include the raising and lowering mechanism 70 in addition to any one of the configurations of the first to third embodiments. The transport system 110 may also include the raising and lowering mechanism 70 in addition to any combination of at least two of the configurations of the first to third embodiments.

Hereinafter, the specific structure and the takeoff operation of the raising and lowering mechanism 70, which is moving means for taking off the transport vehicle 100 in the transport system 110 according to the present embodiment, will be described with reference to FIG. 5A to FIG. 5D. FIG. 5A to FIG. 5D are diagrams showing the specific structure of the raising and lowering mechanism 70 and the takeoff operation, respectively. FIG. 5A to FIG. 5D are side views of the transport system 110 including the raising and lowering mechanism 70, respectively, as viewed in the Y-axis direction.

As shown in FIG. 5A to FIG. 5D, the transport system 110 according to the present embodiment includes a raising and lowering mechanism 70. In the transport path apparatus 102, the raising and lowering mechanism 70 may be provided at one specific location, or a plurality of the raising and lowering mechanisms 70 may be provided at a plurality of locations different in the X-axis direction.

The raising and lowering mechanism 70 is provided on a part of the top plate of the transport path housing 9 in a predetermined section in the X-axis direction and parts of the tracks 1 provided on the top plate. The part of the top plate of the transport path housing 9 and the parts of the tracks 1 are configured to be separable from other parts of the top plate and other parts of the tracks 1, respectively.

The raising and lowering mechanism 70 has a torque for moving the part of the top plate of the transport path housing 9 and the parts of the tracks 1 in the Z-axis direction by driving in the Z-axis direction. When the raising and lowering mechanism 70 descends in the Z-axis direction, the parts of the tracks 1 also descends in the Z-axis direction, so that the levitation transport path 22 also descends in the Z-axis direction.

In the raising and lowering mechanism 70, the raising and lowering range is adjusted so that when the transport vehicle 100 in the landing state is placed at the raising and lowering position of the raising and lowering mechanism 70, the raising and lowering mechanism 70 can descent to a position where levitation reference surface 21 enters the levitation transport path 22.

The raising and lowering mechanism 70 is connected to the control apparatus 14. The control apparatus 14 controls the drive of the raising and lowering mechanism 70 in the Z-axis direction. The control apparatus 14 can acquire the current position of the raising and lowering mechanism 70 from the raising and lowering mechanism 70 and move the raising and lowering mechanism 70 to a predetermined position in the Z-axis direction. The raising and lowering mechanism 70 may be connected to a control apparatus separate from the control apparatus 14, and the drive of the raising and lowering mechanism 70 may be controlled by the control apparatus separate from the control apparatus 14.

The operation of taking off the transport vehicle 100 by the raising and lowering mechanism 70 will be described with reference to FIG. 5A to FIG. 5D. The control of the raising and lowering mechanism 70 for performing the series of operations shown in FIG. 5A to FIG. 5D is performed by the control apparatus 14, but may alternatively be performed by a separate and independent control apparatus.

Figure 5A:
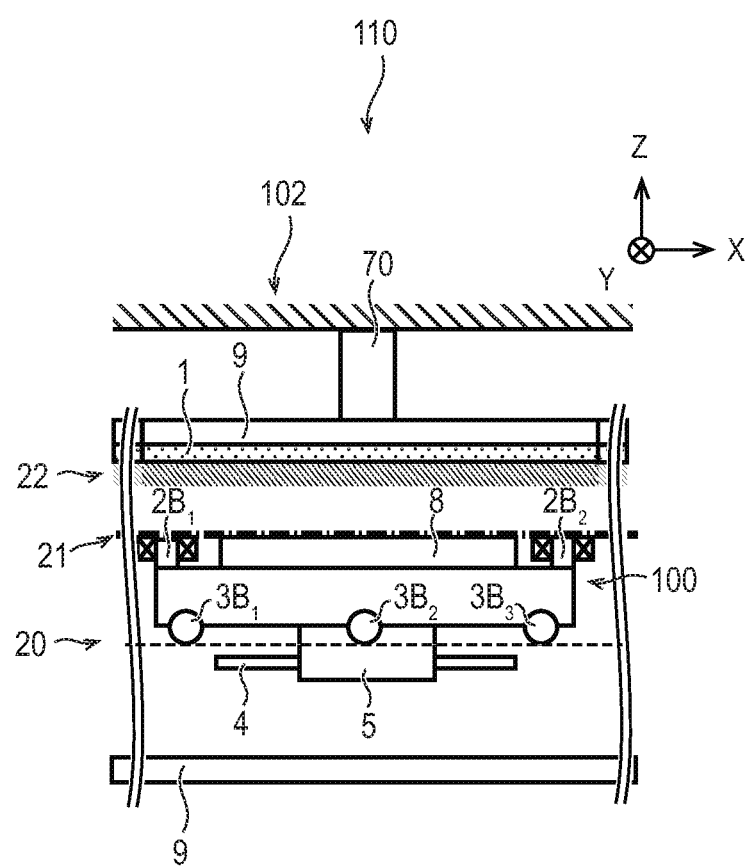
FIG. 5A, FIG. 5B, FIG. 5C, and FIG. 5D are diagrams illustrating a specific structure of a rising and lowering mechanism as moving means and takeoff operation in a transport system according to a fourth embodiment.

First, as shown in FIG. 5A, the transport vehicle 100 is placed at the raising and lowering position of the raising and lowering mechanism 70 in a landing state in which the transport vehicle 100 has landed on the landing transport path 20. At this time, the raising and lowering mechanism 70 is in an initial state before descending. As a method of placing the transport vehicle 100 at the raising and lowering position of the raising and lowering mechanism 70, for example, a method of automatically traveling and placing the transport vehicle 100 in a landing state by a program of a control apparatus 14 included in the transport system 110 or another control apparatus can be used. Similarly, as the placing method, for example, a method of manually transporting and placing the transport vehicle 100 can be used.

Figure 5B:
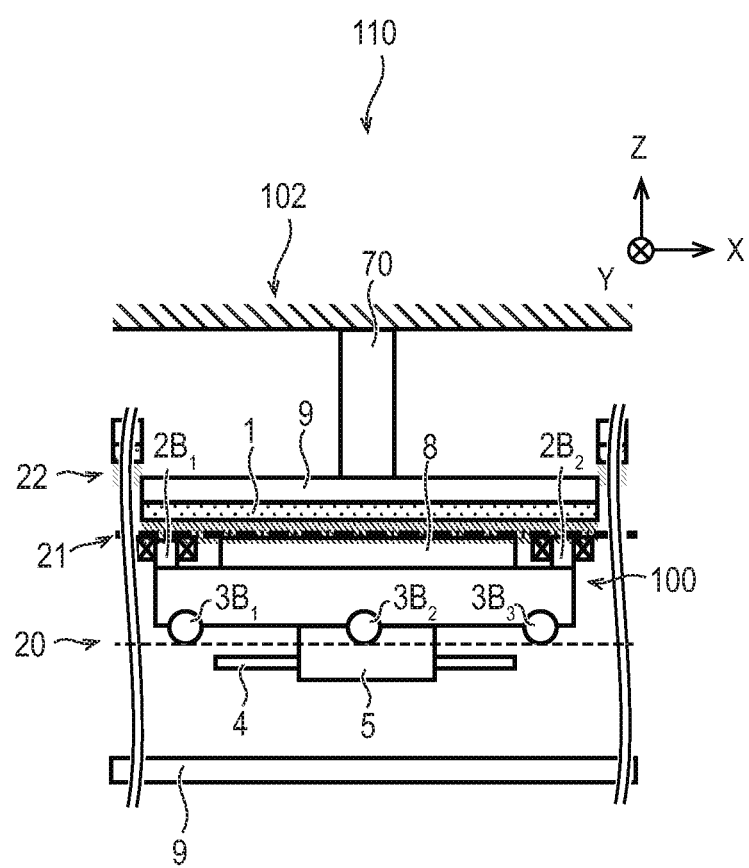

Next, as shown in FIG. 5B, the raising and lowering mechanism 70 descends in the Z-axis direction to a predetermined descending position. Thus, the levitation transport path 22 moves in the Z-axis direction and descends together with the parts of the tracks 1 on which the raising and lowering mechanism 70 is provided. When the levitation transport path 22 descends to the predetermined position, the levitation reference surface 21 of the transport vehicle 100 enters the levitation transport path 22. When the levitation reference surface 21 has entered the levitation transport path 22, the transport vehicle 100 becomes in a state capable of taking off by the levitation force. Thus, the raising and lowering mechanism 70 relatively moves the transport vehicle 100 to a position where the transport vehicle 100 can be levitated by the magnetic force acting between the tracks 1 and the coil arrays 2.

Figure 5C:
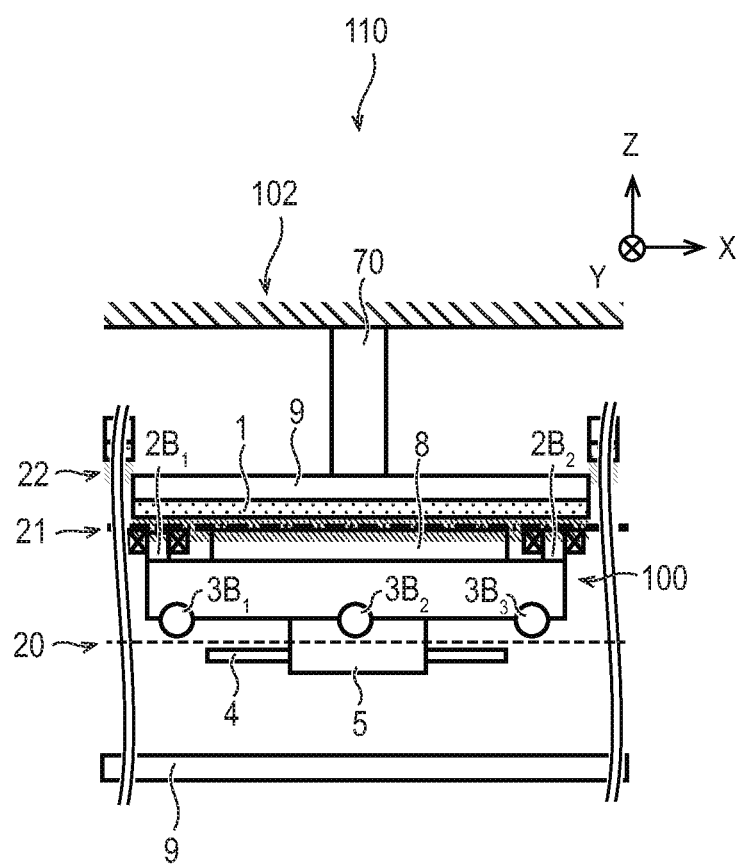

Next, the control apparatus 12 flows currents to the coil arrays 2 to control the levitation force acting on the transport vehicle 100 so that the transport vehicle 100, in which the levitation reference surface 21 has entered the levitation transport path 22, is brought into in the magnetically levitated state. Then, as shown in FIG. 5C, the transport vehicle 100 takes off by receiving the levitation force, and enters the magnetically levitated state.

Figure 5D:
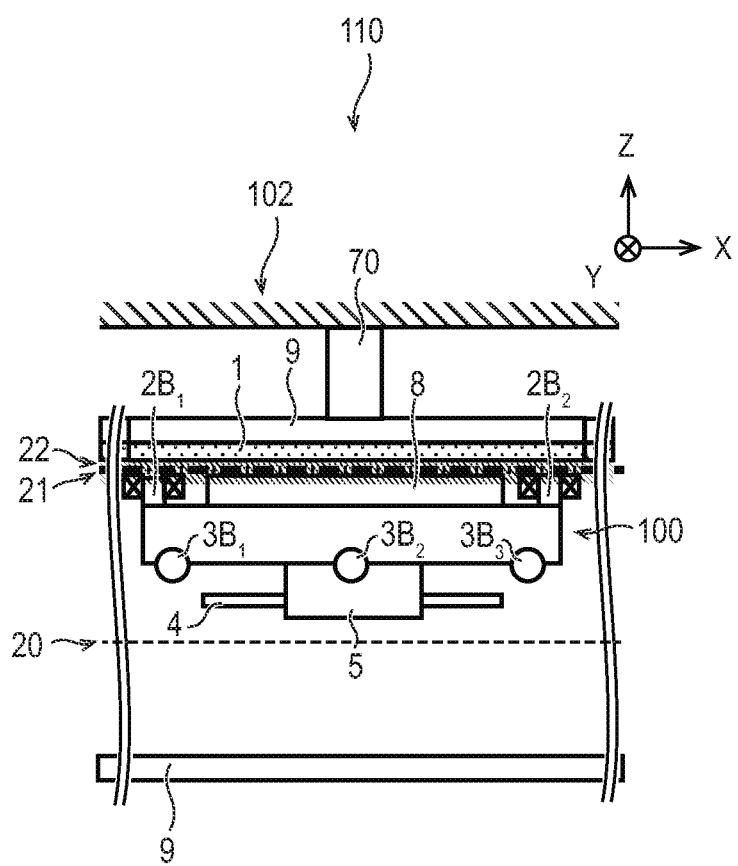

Next, as shown in FIG. 5D, after the transport vehicle 100 takes off, the raising and lowering mechanism 70 ascends in the Z-axis direction to the initial position shown in FIG. 5A. When the raising and lowering mechanism 70 ascends, the levitation transport path 22 ascends, and the transport vehicle 100 also ascends to follow the rising levitation transport path 22 and separates from the landing transport path 20. In this way, the raising and lowering mechanism 70 returns to the initial state, so that the transport vehicle 100 can move from one parts of the tracks 1 to the other parts and travel. Thereafter, the control apparatus 14 begins the flow of current to the coils of the stator 7 to control the thrust acting on the transport vehicle 100, thereby allowing the transport vehicle 100 in the magnetically levitated state to travel along the levitation transport path 22 in the X-axis direction to transport the transport vehicle 100.

By the above operation, the transport vehicle 100 is moved from the landing transport path 20 to the levitation transport path 22, and thus the takeoff of the transport vehicle 100 can be realized.

As described above, according to the present embodiment, the transport vehicle 100 is taken off by the raising and lowering mechanism 70 having a simple structure provided in the transport path apparatus 102. Therefore, according to the present embodiment, it is possible to realize the takeoff of the transport vehicle 100 to be levitated while keeping the cost of the apparatus low.

Fifth Embodiment

A transport system 110 according to a fifth embodiment will be described with reference to FIG. 6 to FIG. 7F. Note that the same components as those in the first to fourth embodiments described above are labeled with the same reference numerals and the description thereof will be omitted or simplified.

First, the schematic configuration of the transport system 110 according to the present embodiment will be described with reference to FIG. 6. FIG. 6 is a side view showing the transport system 110 according to the present embodiment. FIG. 6 is a side view of the transport system 110 viewed from the X-axis direction.

The basic configuration of the transport system 110 according to this embodiment is substantially the same as that according to the first embodiment. The transport system 110 according to the present embodiment includes tracks 1a and 1b formed of a hard magnetic material, that is, a permanent magnet, instead of the tracks 1A and 1B formed of a soft magnetic material. Note that the transport system 110 according to the first to fourth embodiments may have the tracks 1a and 1b instead of the tracks 1A and 1B as in the present embodiment.

Figure 6:
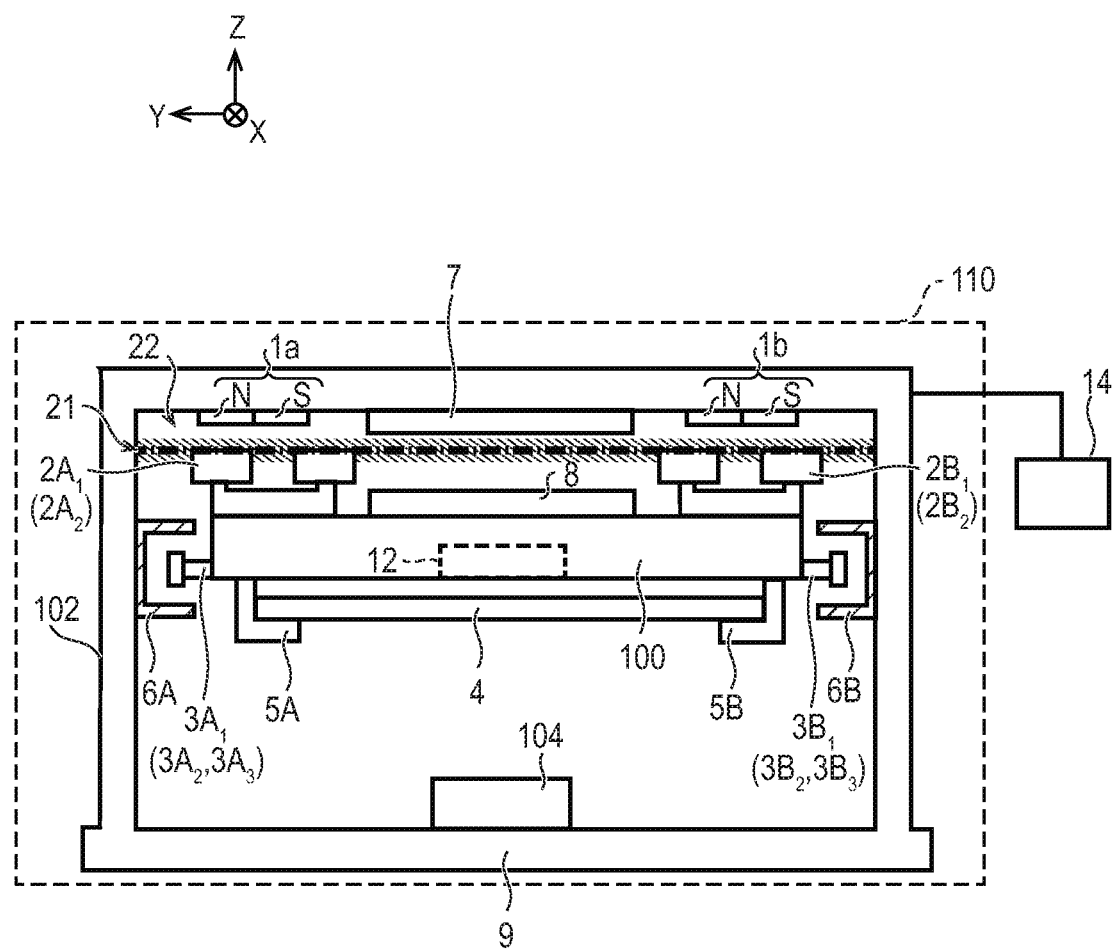
FIG. 6 is a diagram illustrating a schematic configuration of a transport system according to a fifth embodiment.

In the transport system 110 according to the present embodiment, as shown in FIG. 6, strip-shaped tracks 1a and 1*b* formed of permanent magnets and extending in the X-axis direction are attached to the inner surface of the top plate of the transport path housing 9, instead of the tracks 1A and 1B formed of soft magnetic materials. The pair of tracks 1*a* and 1*b* are mounted in parallel with each other at a predetermined interval. Tracks 1*a* and 1*b* include a plurality of permanent magnets arranged in line with each other in the X-axis direction. In each of the tracks 1*a* and 1*b*, the plurality of permanent magnets are arranged such that the magnetic poles of the permanent magnets having different polarities are aligned in the Y-axis direction and the magnetic poles of the permanent magnets adjacent to each other in the X-axis direction are different from each other. Thus, in the present embodiment, the tracks 1*a* and 1*b* are formed of permanent magnets that are magnetic materials of hard magnetic materials.

As described above, the transport system 110 according to the present embodiment has a moving coil (MC) type configuration in which permanent magnets are provided on the tracks 1, which is a stator, and the coil arrays 2 are provided on the transport vehicle 100, which is a mover. The transport system 110 according to the present embodiment can make the transport vehicle 100 travel in the X-axis direction while levitating the transport vehicle 100 in the Z-axis direction by forces acting between the tracks 1*a* and 1*b* formed of the permanent magnets and the coil arrays 2 of the transport vehicle 100 as the levitation force and the thrust force to transport the transport vehicle 100. The control apparatus 12 flow currents to the coil arrays 2 to be able to control the levitation force and the thrust force to the transport vehicle 100. In this embodiment, as in the first embodiment, the force acting between the stator 7 and the secondary conductor plate 8 can also be used as the thrust force. It should be noted that, instead of the MC type structure, the transport system 110 may adopt a moving magnet (MM) type structure in which the coil arrays 2 are provided on the stator and the permanent magnets are provided on the mover, and the same effect can be obtained in this case as well.

In the tracks 1*a* and 1*b* formed of permanent magnets, adsorption forces generate to the iron cores of the coil arrays 2*a* and 2*b*, respectively. The adsorption forces of the tracks 1*a* and 1*b* become larger as the distances to the coil arrays 2A and 2B become smaller. In addition, the control apparatus 12 can flow currents to the coil arrays 2A and 2B so as to generate a magnetic field in a direction of increasing or decreasing the magnetic field by the tracks 1*a* and 1*b* in the coil arrays 2A and 2B. That is, the control apparatus 12 can increase or decrease the adsorption forces between the coil arrays 2A and 2B and the tracks 1*a* and 1*b* by controlling the current flowing through the coil arrays 2A and 2B.

The levitation transport path 22 is a region where the transport vehicle 100 can be levitated when the levitation reference surface 21 is used as a reference. In this embodiment, the lower limit position of the levitation transport path 22 is a position where the gravity of the transport vehicle 100 is balanced with the adsorption force between the tracks 1*a* and 1*b* and the coil arrays 2A and 2B when the maximum currents capable of flowing to the coil arrays 2A and 2B are made to flow so as to strengthen the magnetic field by the tracks 1*a* and 1*b*. The upper limit position of the levitation transport path 22 is a position where the gravity of the transport vehicle 100 is balanced with the adsorption force between the tracks 1*a* and 1*b* and the coil arrays 2A and 2B when the maximum currents capable of flowing to the coil arrays 2A and 2B are made to flow so as to weaken the magnetic field by the tracks 1*a* and 1*b*.

As shown in FIG. 6, in the case of the transport vehicle 100 in the magnetically levitated state, the levitation reference surface 21 is positioned so as to enter above the lower limit position of the levitation transport path 22. That is, if the levitation reference surface 21 is not positioned at the lower limit position or above the lower limit position of the levitation transport path 22, the transport system 110 cannot levitate the transport vehicle 100 because the transport system 110 cannot generate sufficient adsorption force to the transport vehicle 100. When the levitation reference surface 21 is positioned beyond the upper limit position of the levitation transport path 22, the traveling rollers 3 of the transport vehicle 100 lands on the upper surface of the landing transport rails 6 due to the adsorption force between the tracks 1*a* and 1*b* and the coil arrays 2A and 2B. The position of the upper surface of the landing transport rail 6 in the Z-axis direction may be adjusted so that the coil arrays 2A and 2B do not contact the tracks 1*a* and 1*b* when the traveling roller 3 lands on the upper surface of the landing transport rail 6, or may be adjusted so that the coil arrays 2A and 2B contact the tracks 1*a* and 1*b*.

The transport system 110 according to the present embodiment further includes an up-and-down mechanism 33 as moving means for taking off the transport vehicle 100 corresponding to the tracks 1*a* and 1*b* formed of the permanent magnets. Hereinafter, the specific structure and the takeoff operation of the up-and-down mechanism 33, which is moving means for moving the transport vehicle 100 in the transport system 110 according to the present embodiment, will be described with reference to FIG. 7A to FIG. 7F. FIG. 7A to FIG. 7F are diagrams showing the specific structure of the up-and-down mechanism 33 and the takeoff operation, respectively. FIG. 7A to FIG. 7F are side views of the transport system 110 including the up-and-down mechanism 33, respectively, as viewed in the Y-axis direction.

As shown in FIG. 7A to FIG. 7D, the transport system 110 includes a up-and-down mechanism 33. In the transport path apparatus 102, one up-and-down mechanism may be provided at a specific location, or a plurality of up-and-down mechanisms 33 may be provided at different locations in the X-axis direction.

The up-and-down mechanism 33 includes a drive unit 32 that is provided on the bottom plate of the transport path housing 9 and drives in the Z-axis direction, and holding parts 34A and 34B that holds the transport vehicle 100. The up-and-down mechanism 33 has a torque capable of being pulled down in a negative direction in the Z-axis direction while holding the transport vehicle 100 in a landing state landed on the upper surface of the landing transport rails 6 by the holding part 34. By the drive unit 32, the up-and-down mechanism 33 can move in the Z-axis direction and pull down the transport vehicle 100 while holding the transport vehicle 100 by the holding part 34. In the up-and-down mechanism 33, the height in the Z-axis direction, the driving range in the Z-axis direction of the drive unit 32, and the like are adjusted so that the position in the Z-axis direction of the levitation reference surface 21 moves to the region of the levitation transport path 22 when the transport vehicle 100 is pulled down.

The up-and-down mechanism 33 is connected to the control apparatus 14. The control apparatus 14 controls the drive of the up-and-down mechanism 33 in the Z-axis direction by the drive unit 32. The control apparatus 14 controls the holding operation of the transport vehicle 100 by the holding parts 34. The up-and-down mechanism may be connected to a control apparatus separate from the control apparatus, and the drive of the up-and-down mechanism 33 may be controlled by the control apparatus separate from the control apparatus 14.

The operation of taking off the transport vehicle 100 by the up-and-down mechanism 33 will be described with reference to FIG. 7A to FIG. 7F. The control of the up-and-down mechanism 33 for performing the series of operations shown in FIG. 7A to FIG. 7F is performed by the control apparatus 14, but may alternatively be performed by a separate and independent control apparatus.

Figure 7A:
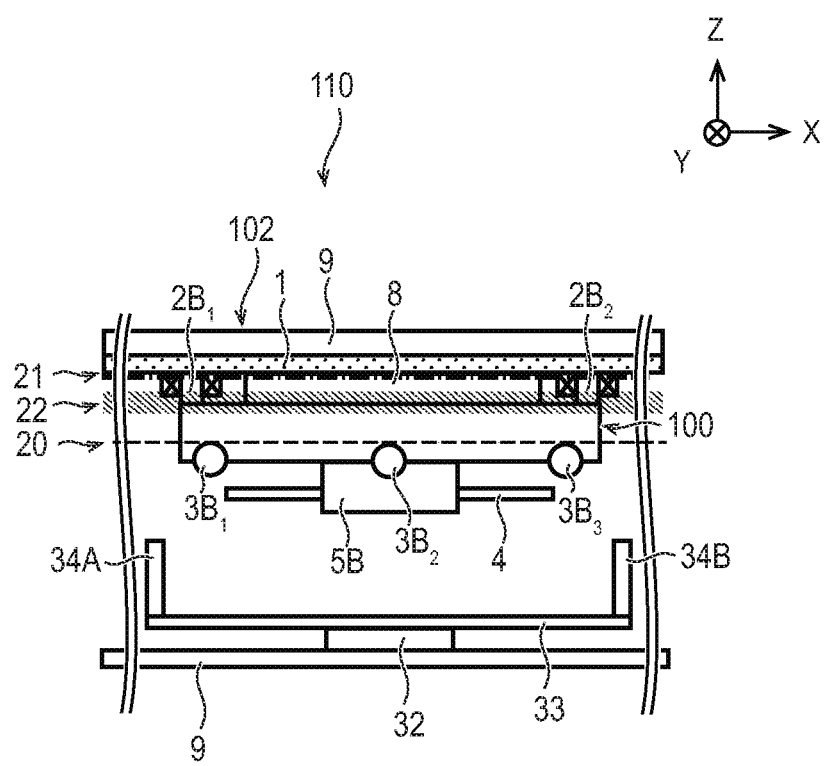
FIG. 7A, FIG. 7B, FIG. 7C, FIG. 7D, FIG. 7E, and FIG. 7F are diagrams illustrating a specific structure of an up-and-down mechanism as moving means and takeoff operation in a transport system according to the fifth embodiment.

First, as shown in FIG. 7A, the transport vehicle 100 in a landing state where the transport vehicle 100 has landed on the landing transport path 20 is placed at a position above the up-and-down mechanism 33 in a state before moving up. Note that, unlike the first embodiment, the landing transport path 20 in the present embodiment is a track of the upper ground plane of the traveling rollers 3 formed by the upper surfaces of the landing transport rails 6. The transport vehicle 100 lands on the upper surfaces of the landing transport rails 6 by the adsorption forces acting between the coil arrays 2A and 2B and the tracks 1a and 1b. The control apparatus 12 can control currents flowing to the coil arrays 2A and 2B to adjust the adsorption forces acting between the coil arrays 2A and 2B and the tracks 1a and 1b. As a method of placing the transport vehicle 100 at a position above the up-and-down mechanism 33, for example, a method of automatically traveling and placing the transport vehicle 100 in a landing state by a program of a control apparatus 14 included in the transport system 110 or another control apparatus can be used. Similarly, as the placing method, for example, a method of manually transporting and placing the transport vehicle 100 can be used.

Figure 7B:
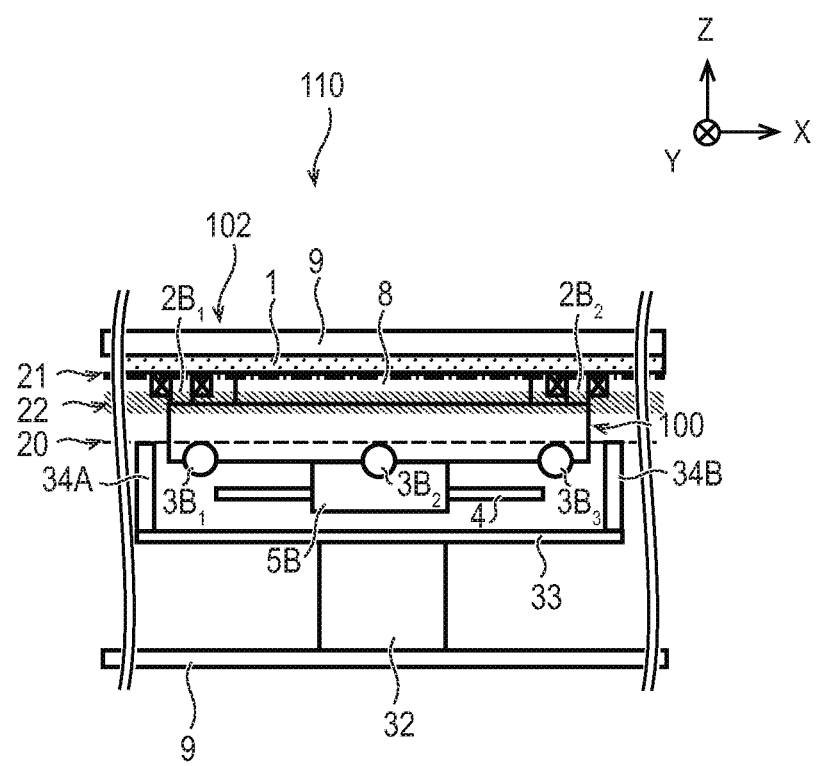

Next, as shown in FIG. 7B, the up-and-down mechanism 33 moves up in the Z-axis direction by the drive unit 32, and moves to a position where the transport vehicle 100 can be held by the holding parts 34.

Figure 7C:
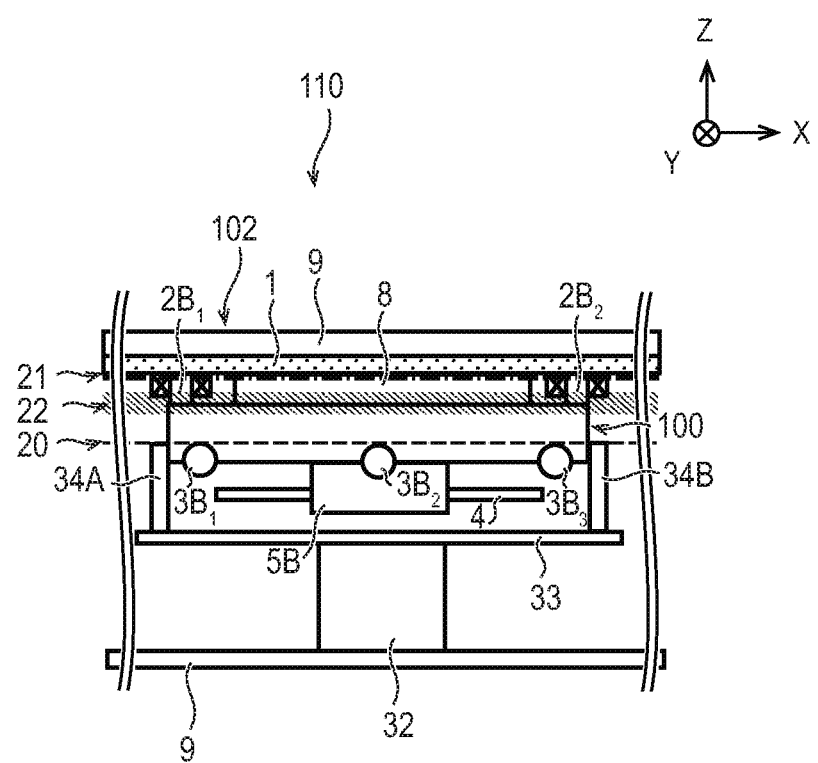

Next, as shown in FIG. 7C, the holding parts 34 hold the transport vehicle 100.

Figure 7D:
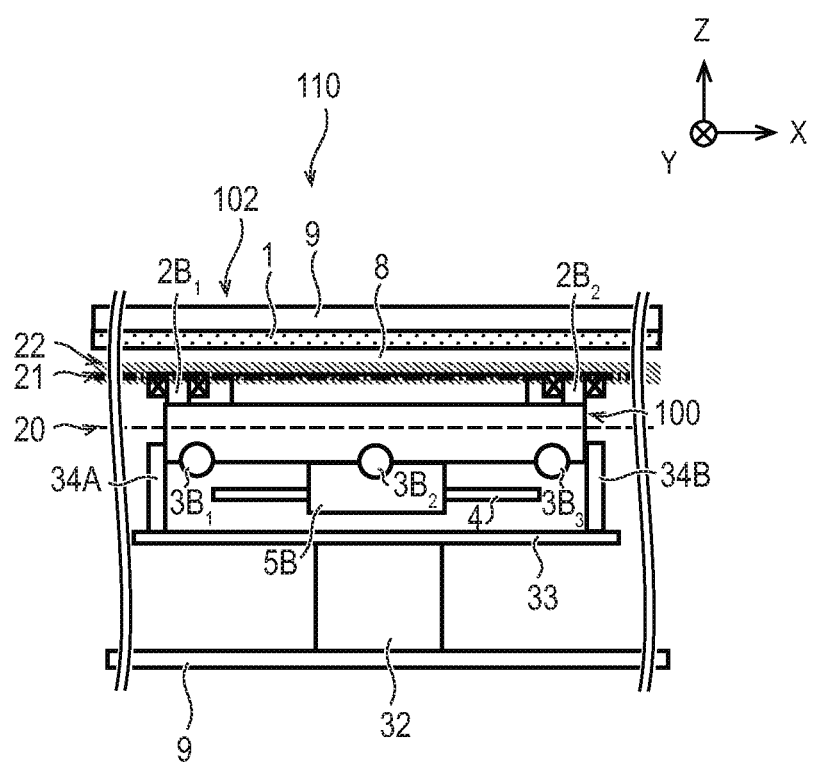

Next, as shown in FIG. 7D, the up-and-down mechanism 33 moves down in the Z-axis direction by the drive unit 32. Thus, the transport vehicle 100 held by the holding parts 34 also moves down. As the up-and-down mechanism 33 moves down in this manner, the levitation reference surface 21 of the transport vehicle 100 enters the levitation transport path 22. When the levitation reference surface 21 has entered the levitation transport path 22, the transport vehicle 100 becomes in a state capable of taking off by the levitation force. Thus, the up-and-down mechanism 33 relatively moves the transport vehicle 100 to a position where it can be levitated by the magnetic forces acting between the tracks 1 and the coil arrays 2.

Figure 7E:
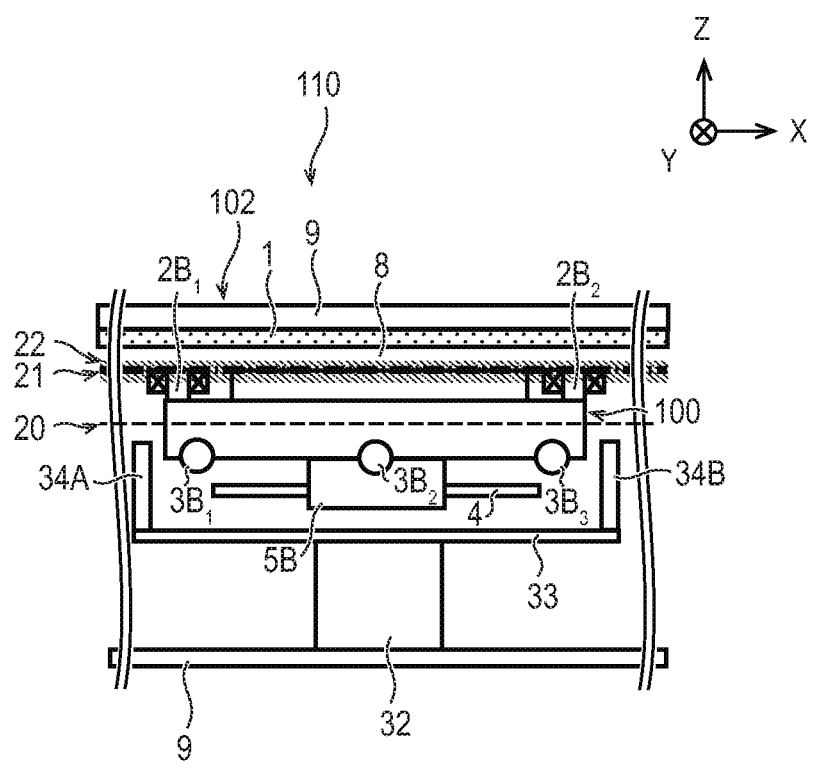

Next, as shown in FIG. 7E, the holding parts 34 release the transport vehicle 100 with the levitation reference surface 21 entering the levitation transport path 22.

Since the levitation reference surface 21 has entered the levitation transport path 22, the transport vehicle 100 takes off by receiving the levitation force, and enters the magnetically levitated state. The control apparatus 12 can control the levitation force by controlling the current flowing in the coil array 2.

Figure 7F:
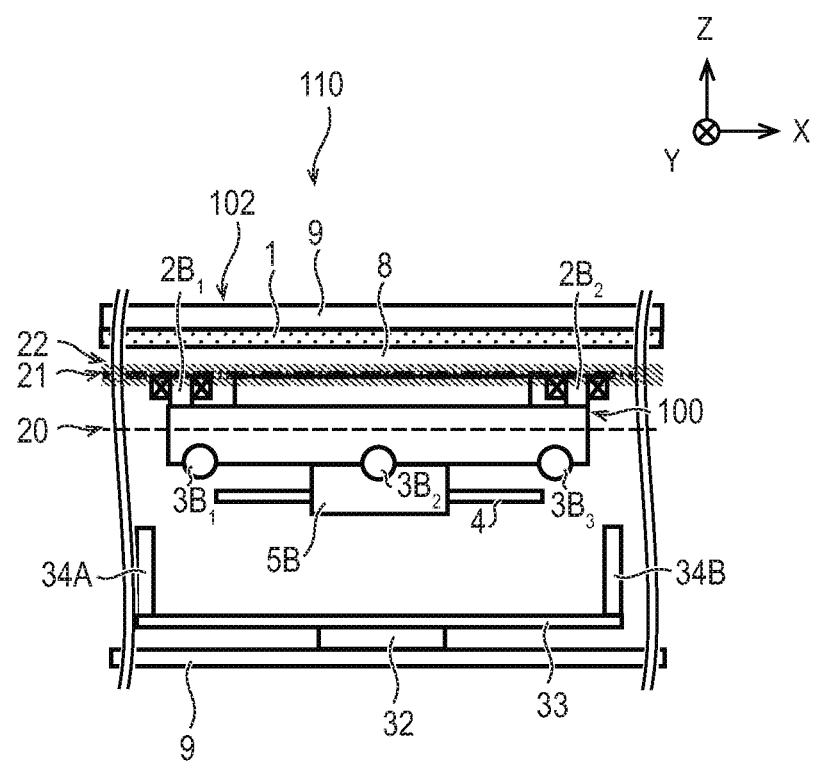

Next, as shown in FIG. 7F, the up-and-down mechanism 33 further moves down by the drive unit 32. Then, the transport vehicle 100 can travel on the levitation transport path 22 without contacting the up-and-down mechanism 33. The control apparatus 12 flows currents to the coil arrays 2 to control the levitation force and the thrust acting on the transport vehicle 100, so that the transport vehicle 100 in the magnetically levitated state can travel along the levitation transport path 22 in the X-axis direction and be transferred.

By the above operation, the transport vehicle 100 is moved from the landing transport path 20 to the levitation transport path 22, and the takeoff of the transport vehicle 100 can be realized.

As described above, according to the present embodiment, the transport vehicle 100 is taken off by the up-and-down mechanism 33 having a simple structure provided in the transport path apparatus 102. Therefore, according to the present embodiment, it is possible to realize the takeoff of the transport vehicle 100 to be levitated while keeping the cost of the apparatus low.

Sixth Embodiment

A transport system 110 according to a sixth embodiment will be described with reference to FIG. 8A to FIG. 8D. Note that the same components as those in the first to fifth embodiments described above are labeled with the same reference numerals and the description thereof will be omitted or simplified.

The basic configuration of the transport system 110 according to this embodiment is substantially the same as that according to the first embodiment. The transport system 110 according to the present embodiment includes slopes 61A and 61B in place of the up-and-down mechanism 30 as moving means for taking off the transport vehicle 100. The transport system 110 may have the slopes 61A and 61B in addition to any one of the configurations of the first to fifth embodiments. The transport system 110 may also include the slopes 61A and 61B in addition to any combination of at least two of the configurations of the first to fifth embodiments.

Hereinafter, the specific structures and takeoff operation of the slopes 61A and 61B, which are moving means for taking off the transport vehicle 100 in the transport system 110 according to the present embodiment, will be described with reference to FIG. 8A to FIG. 8D. FIG. 8A to FIG. 8D are diagrams showing the specific structures of the slopes 61A and 61B and the takeoff operation, respectively. FIG. 8A to FIG. 8D are side views of a transport system 110 including the slopes 61A and 61B as viewed in the Y-axis direction.

As shown in FIG. 8A to FIG. 8D, the transport system 110 according to this embodiment includes slopes 61A and 61B provided in the upper surfaces of the landing transport rails 6 provided on the side plates of the transport path housing 9. The slopes 61A and 61B are similarly provided in the landing transport rails 6A and 6B, respectively. The slope 60A is inclined to gradually leave the track 1 and the slope 60B is inclined to gradually approach the track 1 with respect to the transport vehicle 100 traveling on the upper surfaces of the landing transport rails 6 in one side of the X-axis direction.

The upper surface of the landing transport rail 6 between the slope 61A and the slope 61B is a flat surface 63 parallel to the X-axis direction. The flat surface 63 is lower in the Z-axis direction than the upper surface of the landing transport rail 6 outside the slopes 61A and 61B. The height of the flat surface 63 in the Z-axis direction is a height at which the levitation reference surface 21 of the transport vehicle 100 landing on the flat surface 63 enters the levitation transport path 22. That is, the flat surface 63 is located at a position where the transport vehicle 100 can be levitated by the magnetic forces acting between the tracks 1 and the coil arrays 2. The slopes 61A and 61B are provided so as to be inclined to the side of the flat surface 63, that is, to the side of the position where the transport vehicle 100 can be levitated.

The slopes 61A and 61B have, as inclination angles with respect to the X-axis direction, angles at which the transport vehicle 100 traveling in the X-axis direction can climb up and down in a landing state in which the transport vehicle 100 has landed on the upper surfaces of the landing transport rails 6, respectively. The inclination angles of the slopes 61A and 61B may be the same or different from each other.

The lower surface of the landing transport rail 6 is disposed at a position lower in the Z-axis direction than the flat surface 63 so as to face the upper surface of the landing transport rail 6 including the slopes 61A and 61B and the flat surface 63. Since the lower surface of the landing transport rail 6 is disposed at a position lower than the flat surface 63 in the Z-axis direction, the takeoff of the transport vehicle 100 is not prevented.

In the transport system 110 according to the present embodiment, the transport vehicle 100 travels on the upper surfaces of the landing transport rails 6 each including the slopes 61A and 61B in a landing state, thereby changing the height of the levitation reference surface 21 to take off the transport vehicle 100. The operation of taking off the transport vehicle 100 by the slope 61 will be described with reference to FIG. 8A to FIG. 8D.

Figure 8A:
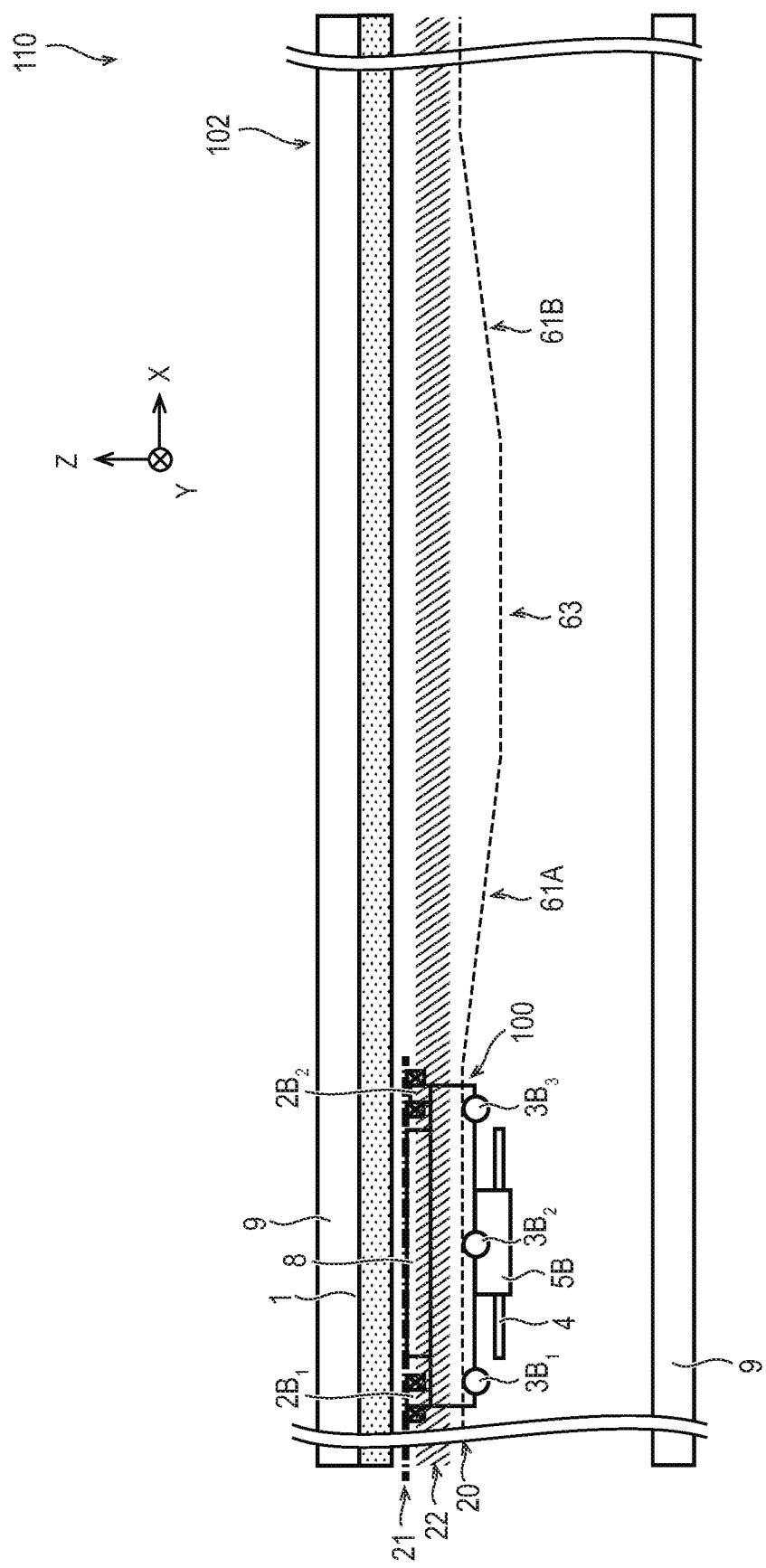

First, as shown in FIG. 8A, the transport vehicle 100 is placed at a position immediately before the slope 61A in a landing state where the transport vehicle 100 has landed on the landing transport path 20. Note that, unlike the first embodiment, the landing transport path 20 in the present embodiment is a track of the upper ground plane of the traveling rollers 3 formed by the upper surfaces of the landing transport rails 6. The transport vehicle 100 lands on the upper surfaces of the landing transport rails 6 by the adsorption forces acting between the coil arrays 2A and 2B and the tracks 1A and 1B. The control apparatus 12 can control currents flowing to the coil arrays 2a and 2B to adjust the adsorption forces acting between the coil arrays 2A and 2B and the tracks 1A and 1B. As a method of placing the transport vehicle 100 at a position immediately before the slope 61A, for example, a method of automatically traveling and placing the transport vehicle 100 in a landing state by a program of a control apparatus 14 included in the transport system 110 or another control apparatus can be used. Similarly, as the placing method, for example, a method of manually transporting and placing the transport vehicle 100 can be used.

Figure 8B:
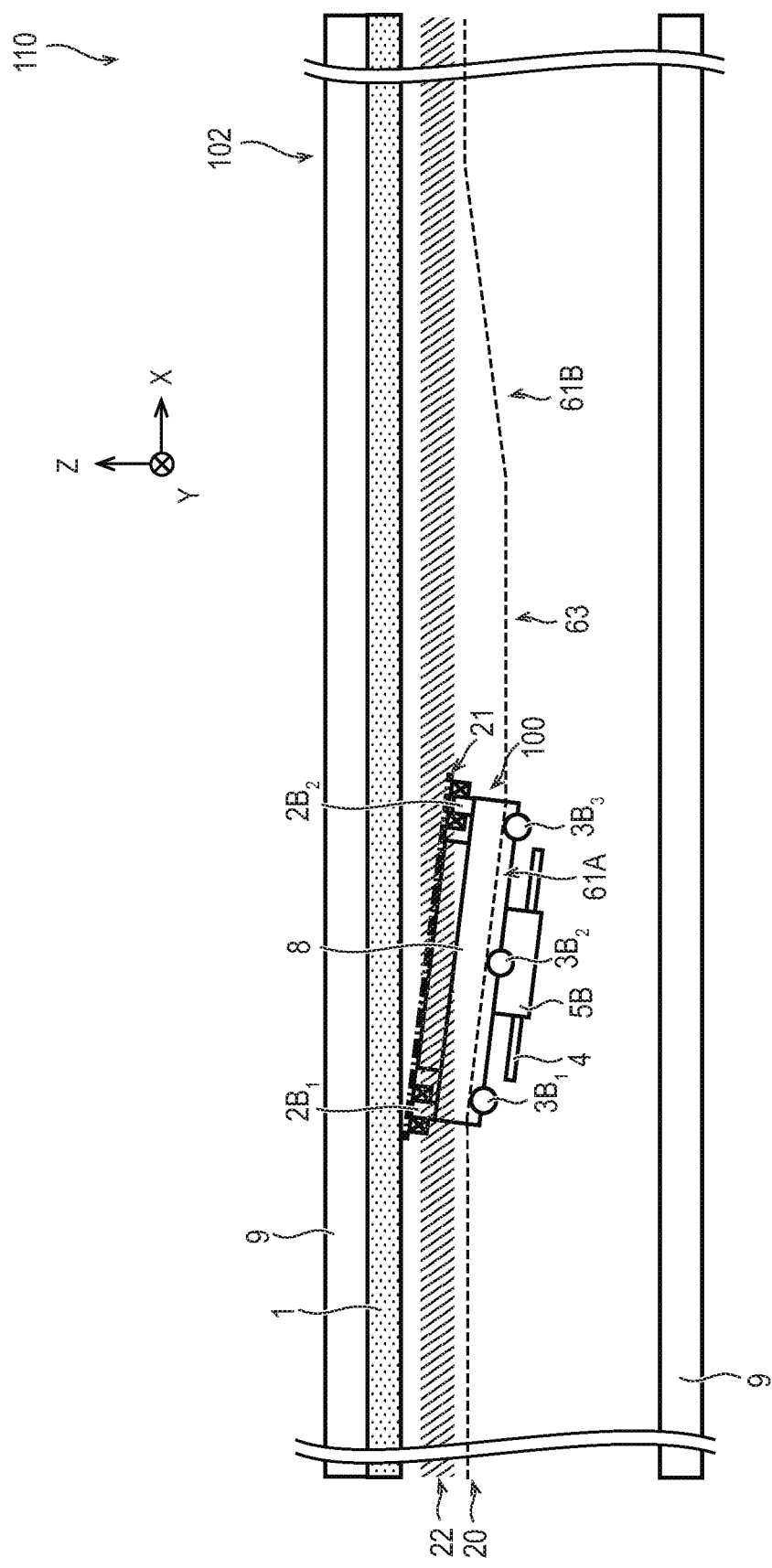

Next, as shown in FIG. 8B, the control apparatus 14 flows currents to the coils of the stator 7 to control the thrust acting on the transport vehicle 100, thereby causing the transport vehicle 100 in the landing state to travel toward the slope 61A in the X-axis direction. As a result, the transport vehicle 100 travels along the slope 61A and gradually leaves from the track 1, so that the transport vehicle 100 moves down the levitation reference surface 21 while leaving from the landing transport path 20.

Next, as shown in FIG. 8C, the transport vehicle 100 travels on the slope 61A to reach the flat surface 63 and is guided to the lowered position. When the transport vehicle 100 is guided to the lowered position, the levitation reference surface 21 of the transport vehicle 100 enters the levitation transport path 22. When the levitation reference surface 21 has entered the levitation transport path 22, the transport vehicle 100 becomes in a state capable of taking off by the levitation force. Thus, the transport vehicle 100 travels on the slope 61A and moves to a position where it can be levitated by the magnetic forces acting between the tracks 1 and the coil arrays 2. When the transport vehicle 100 is ready to take off, the control apparatus 12 flows currents to the coil arrays 2 to control the levitation force acting on the transport vehicle 100 so that the transport vehicle 100 is in a magnetically levitated state. Then, the transport vehicle 100 receives the levitation force to take off, and enters the magnetically levitated state.

Figure 8D:
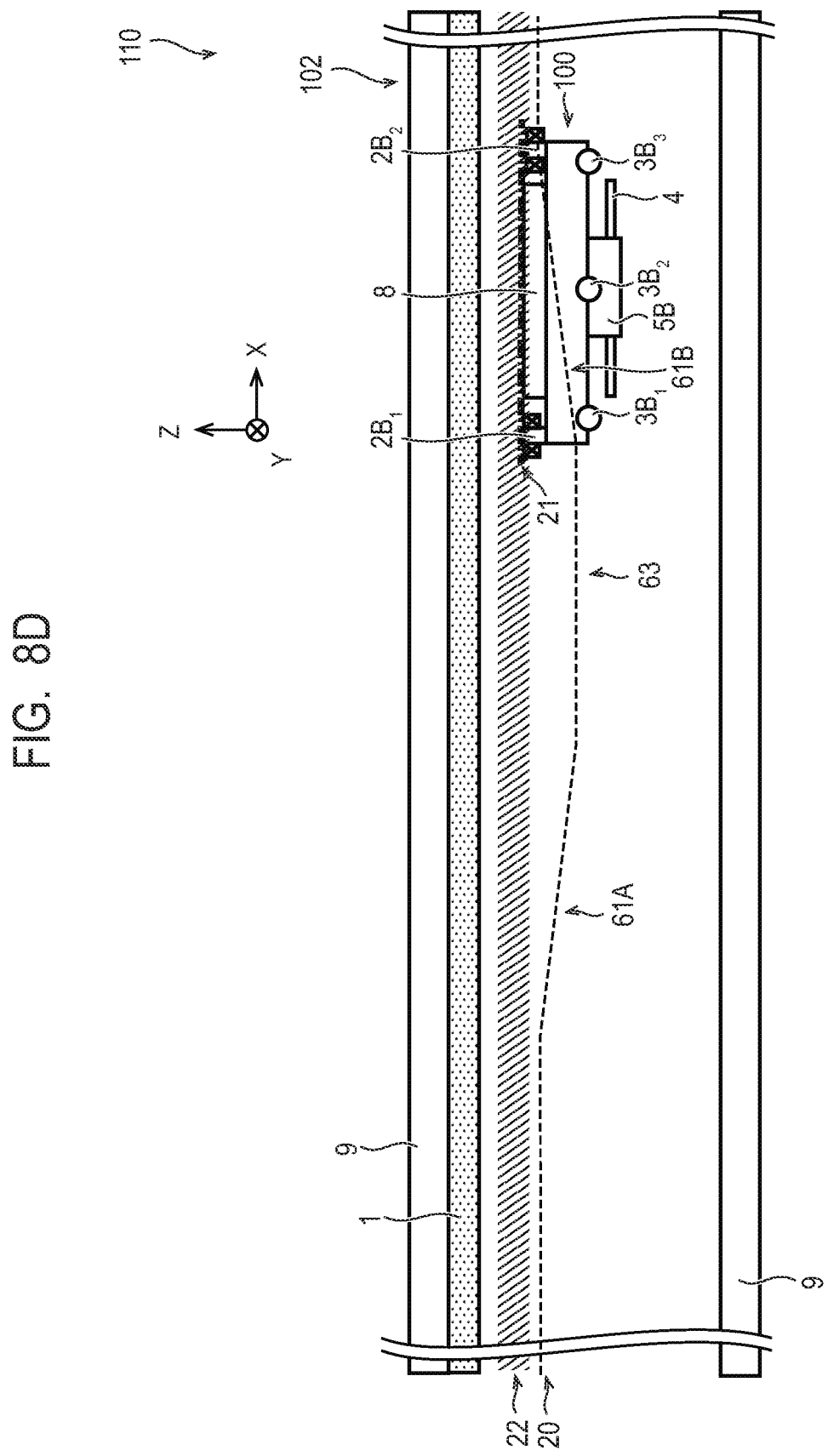

Next, as shown in FIG. 8D, the control apparatus 14 flows currents to the coils of the stator 7 to control the thrust acting on the transport vehicle 100, thereby causing the transport vehicle 100 in the magnetically levitated state to travel along the levitation transport path 22 to transport the transport vehicle 100. Although the slope 61B is disposed toward the landing transport path 20, the transport vehicle 100 does not travel on the slope 61B and does not move to the landing transport path 20 because the transport vehicle 100 takes off in the magnetically levitated state.

It should be noted that the slope 61 is only required to be disposed so that the transport vehicle 100 in a landing state can travel and the levitation reference surface 21 can enter the levitation transport path 22, and the slope 61 is not limited to that disposed as described above. For example, when the transport vehicle 100 travels in one direction as described above, it is sufficient to provide the slope 61A, and the slope 61B is not necessarily be provided. The slope 61B can function as a slope for taking off the transport vehicle 100 in the same manner as the slope 61A when the transport vehicle 100 travels in the opposite direction to the above. Further, for example, the slope 61 may have a stepped shape in which an inclined surface and a flat surface are combined.

By the above operation, the transport vehicle 100 is moved from the landing transport path 20 to the levitation transport path 22, and the takeoff of the transport vehicle 100 can be realized.

As described above, according to the present embodiment, the transport vehicle 100 is taken off by the slope 61 having a simple structure provided on the landing transport rail 6 of the transport path apparatus 102. Therefore, according to the present embodiment, it is possible to realize the takeoff of the transport vehicle 100 to be levitated while keeping the cost of the apparatus low.

Modified Embodiments

Some embodiments are not limited to the embodiments described above, and various modifications are possible.

For example, while the forces acting between the coil arrays 2 and the tracks 1 are used as the levitation force for levitating the transport vehicle 100, and the force acting to the secondary conductor plate 8 is used as the thrust for traveling the transport vehicle 100 in the above embodiment, the transport system is not limited to this. The transport vehicle 100 may be configured to travel while being levitated by the magnetic force acting between a first magnetic force unit as the track 1 provided in the transport path housing 9 and a second magnetic force unit provided in the transport vehicle 100.

In this case, a coil array may be used as one of the first magnetic force unit and the second magnetic force unit, and a soft magnetic material or a hard magnetic material may be used as the other of the first magnetic force unit and the second magnetic force unit. The magnetic levitation type transport system 110 can be configured as an MC type or an MM type.

In the above embodiment, the case where two lines of the tracks 1 are provided is described as an example, but the transport system is not limited to this. The one line of the track 1 or a plurality of lines of two lines or more of the tracks 1 may be provided, and the coil arrays 2 can be provided in the transport vehicle 100 corresponding to the number of lines of the tracks 1.

The transport system according to some embodiments can be used as a transport system that transports a workpiece together with a mover to an operation area of each process apparatus, such as a machine tool that performs each operation process on the workpiece that is an article in a manufacturing system that manufactures an article, such as an electronic device. The process apparatus that performs the operation process may be any apparatus such as an apparatus that performs assembly of a component to a workpiece, an apparatus that performs painting, or the like. Further, the article to be manufactured is not limited to a particular article and may be any component.

In this way, the transport system according to some embodiments can be used to transport a workpiece to an operation area, perform an operation process on the workpiece transported in the operation area, and manufacture an article.

As described above, according to some embodiments, it is possible to realize the takeoff of the transport vehicle to be levitated while keeping the cost of the apparatus low.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2020-161489, which was filed on Sep. 25, 2020 and which is hereby incorporated by reference herein in its entirety.

What is claimed is:

1. A transport system comprising:
a transport path housing;
a first magnetic force unit provided in the transport path housing;
a transport vehicle that includes a second magnetic force unit provided so as to be able to face the first magnetic force unit and is able to travel along the transport path housing while being levitated by magnetic force acting between the first magnetic force unit and the second magnetic force unit;
a rail on which the transport vehicle lands to be able to travel, the rail being provided in the transport path housing; and
at least one moving means for moving the transport vehicle in a landing state where the transport vehicle lands on the rail, to a position where the transport vehicle is able to be levitated by the magnetic force,
wherein the moving means moves the transport vehicle along a horizontal direction to move the transport vehicle to the position where the transport vehicle is able to be levitated.

2. The transport system according to claim 1,
wherein the moving means includes an up-and-down mechanism that moves the transport vehicle along a vertical direction to move the transport vehicle to the position where the transport vehicle is able to be levitated.

3. The transport system according to claim 1,
wherein the moving means includes a slope on which the transport vehicle in the landing state travels to move to the position where the transport vehicle is be able to be levitated.

4. The transport system according to claim 3,
wherein the rail includes a lower surface on which the transport vehicle lands by gravity, and
wherein the slope is provided in the lower surface so as to incline to a side of the position where the transport vehicle is be able to be levitated.

5. The transport system according to claim 3,
wherein the rail includes an upper surface on which the transport vehicle lands by the magnetic force, and
wherein the slope is provided in the upper surface so as to incline to a side of the position where the transport vehicle is be able to be levitated.

6. The transport system according to claim 1,
wherein the moving means includes a raising and lowering mechanism that moves down the first magnetic force unit to relatively move the transport vehicle to the position where the transport vehicle is able to be levitated.

7. The transport system according to claim 1, comprising a control apparatus that makes the transport vehicle in the landing state travel to move the transport vehicle to a position where the moving means moves the transport vehicle.

8. The transport system according to claim 1,
wherein the moving means is provided in the transport path housing.

9. The transport system according to claim 1,
wherein the first magnetic force unit is formed of a magnetic material of soft magnetic material or hard magnetic material, and
wherein the second magnetic force unit is formed of a coil array including a plurality of coils.

10. A processing system comprising:
the transport system according to claim 1; and
a processing apparatus that performs processing on a workpiece transported by the transport vehicle.

11. A method of manufacturing an article by using the processing system according to claim 10, the method comprising:
transporting the workpiece by using the transport vehicle; and
performing, by using the processing apparatus, the processing on the workpiece transported by the transport vehicle.

* * * * *